(12) United States Patent
Komatsu et al.

(10) Patent No.: US 8,024,071 B2
(45) Date of Patent: Sep. 20, 2011

(54) ROBOT, CONTROLLING DEVICE AND CONTROLLING METHOD FOR ROBOT, AND CONTROLLING PROGRAM FOR ROBOT-CONTROLLING DEVICE

(75) Inventors: Mayumi Komatsu, Kyoto (JP); Yasunao Okazaki, Shiga (JP)

(73) Assignee: Panasonic Corporation, Osaka (JP)

( * ) Notice: Subject to any disclaimer, the term of this patent is extended or adjusted under 35 U.S.C. 154(b) by 0 days.

(21) Appl. No.: 12/712,441

(22) Filed: Feb. 25, 2010

(65) Prior Publication Data
US 2010/0152896 A1 Jun. 17, 2010

Related U.S. Application Data

(63) Continuation of application No. PCT/JP2009/000382, filed on Feb. 2, 2009.

(30) Foreign Application Priority Data

Feb. 6, 2008 (JP) ................................. 2008-026489

(51) Int. Cl.
*G05B 15/00* (2006.01)
(52) U.S. Cl. ........ 700/258; 700/245; 700/253; 700/254; 700/260; 700/261; 318/568.22; 318/574; 318/577; 318/587; 901/15; 901/17; 901/34; 701/50; 600/437
(58) Field of Classification Search .................. 700/245, 700/253, 254, 258, 260, 261; 318/568.22, 318/574, 577, 587; 901/15, 17, 34; 701/50; 600/437
See application file for complete search history.

(56) References Cited

U.S. PATENT DOCUMENTS

| 4,987,356 | A | * | 1/1991 | Yamada et al. | 318/578 |
| 5,732,195 | A | * | 3/1998 | Nakata et al. | 700/260 |
| 5,915,073 | A | * | 6/1999 | Maeda | 700/245 |
| RE36,929 | E | * | 10/2000 | Takayama et al. | 318/568.11 |
| 6,219,589 | B1 | * | 4/2001 | Faraz et al. | 700/254 |
| 6,272,396 | B1 | * | 8/2001 | Taitler | 700/245 |
| 6,285,920 | B1 | * | 9/2001 | McGee et al. | 700/254 |
| 6,294,890 | B1 | * | 9/2001 | Shimada et al. | 318/570 |
| 6,301,526 | B1 | * | 10/2001 | Kim et al. | 700/260 |
| 6,430,473 | B1 | * | 8/2002 | Lee et al. | 700/245 |
| 6,477,445 | B1 | * | 11/2002 | Ramstrom et al. | 700/245 |

(Continued)

FOREIGN PATENT DOCUMENTS

| JP | 05-313746 | 11/1993 |
| JP | 2000-343470 | 12/2000 |
| JP | 2001-113481 | 4/2001 |

OTHER PUBLICATIONS

International Preliminary Report on Patentability (in English) issued Sep. 16, 2010 in PCT/JP2009/000382.

(Continued)

*Primary Examiner* — James P Trammell
*Assistant Examiner* — McDieunel Marc
(74) *Attorney, Agent, or Firm* — Wenderoth, Lind & Ponack, L.L.P.

(57) ABSTRACT

Based upon a force in a vertical direction exerted between an object and a hand and an angle made by the hand relative to a horizontal face, a transporting force estimation unit estimates a transporting force applied in the vertical direction by a person, and based upon the estimated force, a force controlling operation is carried out so as to set a force in the vertical direction of the robot arm of a robot system to a predetermined force.

10 Claims, 16 Drawing Sheets

U.S. PATENT DOCUMENTS

| | | | | |
|---|---|---|---|---|
| 6,522,952 | B1 * | 2/2003 | Arai et al. | 700/258 |
| 6,654,665 | B2 * | 11/2003 | Arai et al. | 700/258 |
| 7,027,031 | B2 * | 4/2006 | Kawasaki et al. | 700/245 |
| 7,443,115 | B2 * | 10/2008 | Okamoto et al. | 318/100 |
| 7,558,647 | B2 * | 7/2009 | Okazaki | 700/258 |
| 7,747,351 | B2 * | 6/2010 | Tsusaka et al. | 700/245 |
| 7,778,732 | B2 * | 8/2010 | Adachi et al. | 700/245 |
| 2003/0135303 | A1 | 7/2003 | Arai et al. | |
| 2008/0021317 | A1 * | 1/2008 | Sumanaweera | 600/437 |
| 2009/0171505 | A1 * | 7/2009 | Okazaki | 700/258 |

OTHER PUBLICATIONS

International Search Report issued Mar. 10, 2009 in International (PCT) Application No. PCT/JP2009/000382.

Y. Hayashibara et al., "Human-Robot Cooperative Handling of a Long Object (Control Method in a Vertical Plane Based on Human Cooperative Behavior)", *Transactions of the Japan Society of Mechanical Engineers, Series C* (Jan. 2001), vol. 67, No. 653, pp. 162-169.

* cited by examiner

| $F_z$ \ $\omega_p$ | POSITIVE | NEGATIVE |
|---|---|---|
| $-\varepsilon$ | 31 | 31 |
| −5 | 31.5 | 30 |
| −10 | 32 | 29 |
| −15 | 32.5 | 29 |
| −20 | 33 | 29 |
| −25 | 33.5 | 29 |
| −30 | 34 | 29 |
| −35 | 34.5 | 29 |
| −40 | 35 | 29 |
| −45 | 35.5 | 29 |
| −50 | 36 | 29 |

$k_\omega$

| $F_z$ \ $\omega_p$ | POSITIVE | NEGATIVE |
|---|---|---|
| $-\varepsilon$ | 0.5 | 0.5 |
| −5 | 0.51 | 0.5 |
| −10 | 0.52 | 0.5 |
| −15 | 0.53 | 0.5 |
| −20 | 0.54 | 0.5 |
| −25 | 0.55 | 0.5 |
| −30 | 0.56 | 0.5 |
| −35 | 0.57 | 0.5 |
| −40 | 0.58 | 0.5 |
| −45 | 0.59 | 0.5 |
| −50 | 0.6 | 0.5 |

$k_p$

ROBOT, CONTROLLING DEVICE AND CONTROLLING METHOD FOR ROBOT, AND CONTROLLING PROGRAM FOR ROBOT-CONTROLLING DEVICE

This is a continuation application of International Application No. PCT/JP2009/000382, filed Feb. 2, 2009.

BACKGROUND OF THE INVENTION (1) Field of the Invention

The present invention relates to a robot used for carrying out a work (cooperative work) between a person and the robot in cooperation with each other, a controlling device and a controlling method for such a robot, as well as to a controlling program for the robot-controlling device.

(2) Description of Related Art

In recent years, house-service robots, such as nursing robots and house-keeping support robots, have been vigorously developed. Moreover, in the industrial robots also, different from those conventional robots isolated from people, those which carry out a cooperative work with a person have increased in number. Since those robots carry out works near people, physical contact with a person is inevitably required. For this reason, from the viewpoint of safety, those robots need to be mechanically flexible, and to move in a flexible manner.

As one example of a robot device, a device has been proposed in which a person and a robot arm transport an object in cooperation with each other. Among such devices, a technique has been proposed in which the rotating movement of a hand that is located at an end of the robot arm is controlled so that the rotating force of the hand corresponding to the end of the robot arm is set to zero, while the translation movement in a vertical direction of the hand is controlled so that the object is maintained in its horizontal state (see Patent Document 1).

By using the technique of Patent Document 1, even in a case where the mass of an object is unknown or changed on the way, which causes problems conventionally, a cooperative transporting operation can be achieved.

Patent Document 1: JP-A No. 2000-343470

BRIEF SUMMARY OF THE INVENTION ISSUES TO BE SOLVED BY THE INVENTION

In the related art of Patent Document 1, however, since a robot arm 101 is shifted upward and downward so as to horizontally maintain an object 103A to be transported regardless of a force exerted on the robot arm 101, as shown in FIG. 13A, a phenomenon tends to occur in which, in a case where another object 103B is located below the object 103A to be transported and when a person 102 tries to lower the transporting object 103A, even if the objects 103A and 103B are made in contact with each other, the robot arm 101 tries to further move downward. For this reason, as shown in FIGS. 13A and 13B, problems arise in that the objects 103A and 103B are pressed onto each other to be damaged and in that an excessive load is imposed on the robot arm 101.

In view of these issues, the present invention has been devised, and its object is to provide a robot which can carry out the transporting process even when, upon transporting an object by a person and a robot arm in cooperation with each other, the weight of the object is unknown or the weight is changed on the way, and can achieve safe robot controlling operations without pressing the objects onto each other beyond the necessity even when another object is located below the robot arm or the object being transported, and a controlling device and a controlling method for the robot, as well as a controlling program for such a robot controlling device.

In order to achieve the above-mentioned objective, the present invention has the following structures:

According to a first aspect of the present invention, there is provided a robot that has a robot arm and a hand arranged at an end of the robot arm, and transports an object positioned between a person and the robot in cooperation with the person, with the object being held by the person and the hand, the robot comprising:

a driving unit that adjusts an angle of the hand;

a force detection unit that detects and outputs a force exerted between the object and the hand;

an angle detection unit that detects and outputs the angle of the hand; and a control unit that carries out a force controlling operation for controlling so as to set a force in a vertical direction of the robot arm to a predetermined force, based upon the output of the angle detection unit and the output of the force detection unit.

With this arrangement, it becomes possible to achieve a robot controlling operation in which, by estimating a transporting force of the person regardless of the weight of the object to be transported, the object can be transported by the robot arm and the person in cooperation with each other.

Moreover, according to a fourth aspect of the present invention, there is provided a robot-controlling device that controls a robot provided with a robot arm and a hand arranged at an end of the robot arm, so as to transport an object positioned between a person and the robot in cooperation with the person, with the object being held by the person and the hand, the robot-controlling device comprising:

an input unit to which force information detected by a force detection unit that detects a force exerted between the object and the hand, and angle information detected by an angle detection unit that detects an angle of the hand that is angle-adjusted by a driving unit are inputted; and a control unit that carries out a force controlling operation for controlling so as to set a force in a vertical direction of the robot arm to a predetermined force, based upon the force information of the force detection unit and the angle information of the angle detection unit.

With this arrangement, it becomes possible to achieve a robot controlling operation in which the object can be safely placed thereon horizontally when the person tries to place the object, for example, on a desk.

According to a ninth aspect of the present invention, there is provided a robot-controlling method that controls a robot provided with a robot arm and a hand arranged at an end of the robot arm, so as to transport an object positioned between a person and the robot in cooperation with the person, with the object being held by the person and the hand, the robot-controlling method comprising:

acquiring force information detected by a force detection unit that detects a force exerted between the object and the hand, and angle information detected by an angle detection unit that detects an angle of the hand that is angle-adjusted by a driving unit; and by using a control unit, carrying out a force controlling operation for controlling so as to set a force in a vertical direction of the robot arm to a predetermined force, based upon the force information of the force detection unit and the angle information of the angle detection unit.

According to a tenth aspect of the present invention, there is provided a controlling program for a robot-controlling device that controls a robot provided with a robot arm and a hand arranged at an end of the robot arm, so as to transport an object positioned between a person and the robot in cooperation with the person, with the object being held by the person and the hand, the controlling program for the robot-controlling device allowing a computer to carry out functions of:

acquiring force information detected by a force detection unit that detects a force exerted between the object and the hand, and angle information detected by an angle detection unit that detects an angle of the hand that is angle-adjusted by a driving unit; and by using a control unit, carrying out a force controlling operation for controlling so as to set a force in a vertical direction of the robot arm to a predetermined force, based upon the force information of the force detection unit and the angle information of the angle detection unit.

With this arrangement, it becomes possible to achieve a robot controlling operation in which, by estimating a transporting force of the person regardless of the weight of the object to be transported, the object can be transported by the robot arm and the person in cooperation with each other.

Effects of the Invention

As described above, in accordance with a robot of the present invention and the controlling device and controlling method for such a robot, as well as the controlling program for the robot-controlling device, upon transporting the object by the person and the robot arm of the robot in cooperation with each other, the control unit estimates the force imposed on the object in the vertical direction by the person while assisting the weight of the object, based upon the force being exerted on the hand of the robot arm and the angle of the hand corresponding to the end of the robot arm, and based upon the estimated force, the control unit carries out the force controlling operation in the vertical direction so that it is possible to provide a robot controlling operation which allows the robot arm and the person to transport the object in cooperation with each other even when the weight of the object is unknown or the weight is changed on the way.

Moreover, by estimating the force exerted by the person to try to transport based upon the force exerted on the hand of the robot arm and the angle of the hand, as well as by simultaneously controlling the force in the vertical direction based upon the force exerted on the hand of the robot arm, it is possible to provide a safe robot controlling operation in which, even when the object to be transported interferes with another object located below, the objects are prevented from being forcefully pressed onto each other.

BRIEF DESCRIPTION OF THE DRAWINGS

These and other aspects and features of the present invention will become clear from the following description taken in conjunction with the preferred embodiments thereof with reference to the accompanying drawings, in which.

DETAILED DESCRIPTION OF THE INVENTION

Figure 1:
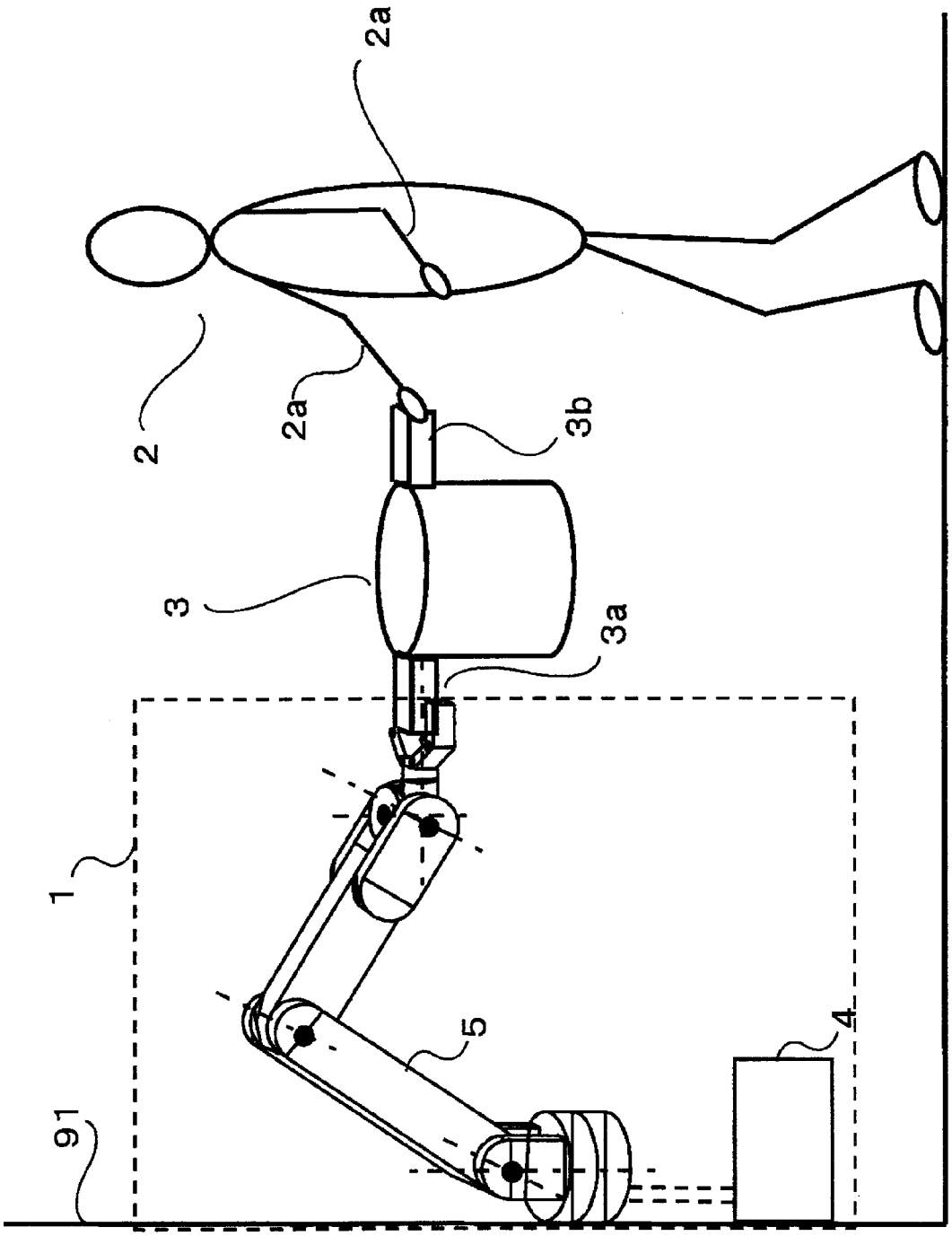
FIG. 1 is a view that shows a schematic structure of a robot system in accordance with one embodiment of the present invention.

Prior to detailed explanations of the embodiments of the present invention by reference to the drawings, the following description will discuss various aspects of the present invention.

According to a first aspect of the present invention, there is provided a robot that has a robot arm and a hand arranged at an end of the robot arm, and transports an object positioned between a person and the robot in cooperation with the person, with the object being held by the person and the hand, the robot comprising:

a driving unit that adjusts an angle of the hand;

a force detection unit that detects and outputs a force exerted between the object and the hand;

an angle detection unit that detects and outputs the angle of the hand; and a control unit that carries out a force controlling operation for controlling so as to set a force in a vertical direction of the robot arm to a predetermined force, based upon the output of the angle detection unit and the output of the force detection unit.

According to a second aspect of the present invention, there is provided the robot according to the first aspect wherein the control unit estimates a force that the person exerts on the robot in the vertical direction, by using the output of the angle detection unit and the output of the force detection unit, and carries out the force controlling operation so as to set the force in the vertical direction of the robot arm to a predetermined force, based upon the estimated force.

According to a third aspect of the present invention, there is provided the robot according to the first aspect or the second aspect wherein the force detection unit detects and outputs a force exerted between the object and the hand in the vertical direction, and the control unit determines an input in the vertical direction of the force controlling operation based upon the output of the angle detection unit and the output of the force detection unit so as to carry out the force controlling operation in such a manner that, in a case where the person raises the object to cause the input in the vertical direction of the force controlling operation to become upward, the robot arm is raised, while, in a case where the person lowers the object to cause the input in the vertical direction of the force controlling operation to become downward, the robot arm is lowered; the control unit carries out the force controlling operation so as to increase an upward force of the robot arm in a case where the force in the vertical direction detected by the force detection unit becomes large; and the control unit carries out the force controlling operation so as to decrease the upward force of the robot arm in a case where the force in the vertical direction detected by the force detection unit becomes smaller.

According to a fourth aspect of the present invention, there is provided a robot-controlling device that controls a robot provided with a robot arm and a hand arranged at an end of the robot arm, so as to transport an object positioned between a person and the robot in cooperation with the person, with the object being held by the person and the hand, the robot-controlling device comprising:

an input unit to which force information detected by a force detection unit that detects a force exerted between the object and the hand, and angle information detected by an angle detection unit that detects an angle of the hand that is angle-adjusted by a driving unit are inputted; and a control unit that carries out a force controlling operation for controlling so as to set a force in a vertical direction of the robot arm to a predetermined force, based upon the force information of the force detection unit and the angle information of the angle detection unit.

According to a fifth aspect of the present invention, there is provided the robot-controlling device according to the fourth aspect of the present invention, further comprising a transporting force estimation unit that estimates a force that the person exerts on the robot in the vertical direction, based on the output of the angle detection unit and the output of the force detection unit, wherein based on the estimated force by the transporting force estimation unit, the robot-controlling device carries out the force controlling operation for controlling so as to set the force in the vertical direction of the robot arm to the predetermined force.

According to a sixth aspect of the present invention, there is provided the robot-controlling device according to the fifth aspect wherein the transporting force estimation unit uses a value obtained by adding a value prepared by multiplying the output of the angle detection unit by a coefficient to a value prepared by multiplying the vertical component of the output of the force detection unit by a coefficient, as input in the vertical direction of the force controlling operation.

According to a seventh aspect of the present invention, there is provided the robot-controlling device according to any one of the fourth to sixth aspects, further comprising a hand position detection unit that detects a position of the hand of the end of the robot arm, and a transported object placed-state determining unit that determines whether or not the transported object has been placed on an object placing face based upon output of the hand position detection unit, output of the angle detection unit, and output of the force detection unit, wherein, upon determination by the transported object placed-state determining unit that the object has been placed on the object placing face, a controlling operation in the vertical direction of the robot arm is switched from the force-controlling operation to a position-controlling operation.

According to an eighth aspect of the present invention, there is provided the robot-controlling device according to the seventh aspect wherein, when the hand of the robot arm is directed downward from a horizontal face by the output of the angle detection unit, when variation of the hand position is turned from a downward direction to a constant state by the output of the hand position detection unit, and when a downward force in the vertical direction of output of the force detection unit is turned into a decrease, the transported object placed-state determining unit determines that the transported object has been placed on the object placing face.

According to a ninth aspect of the present invention, there is provided a robot-controlling method that controls a robot provided with a robot arm and a hand arranged at an end of the robot arm, so as to transport an object positioned between a person and the robot in cooperation with the person, with the object being held by the person and the hand, the robot-controlling method comprising:

inputting force information detected by a force detection unit that detects a force exerted between the object and the hand, and angle information detected by an angle detection unit that detects an angle of the hand that is angle-adjusted by a driving unit; and by using a control unit, carrying out a force controlling operation for controlling so as to set a force in a vertical direction of the robot arm to a predetermined force, based upon the force information of the force detection unit and the angle information of the angle detection unit.

According to a tenth aspect of the present invention, there is provided a controlling program for a robot-controlling device that controls a robot provided with a robot arm and a hand arranged at an end of the robot arm, so as to transport an object positioned between a person and the robot in cooperation with the person, with the object being held by the person and the hand, the controlling program for the robot-controlling device allowing a computer to carry out functions of:

acquiring force information detected by a force detection unit that detects a force exerted between the object and the hand, and angle information detected by an angle detection unit that detects an angle of the hand that is angle-adjusted by a driving unit; and by using a control unit, carrying out a force controlling operation for controlling so as to set a force in a vertical direction of the robot arm to a predetermined force, based upon the force information of the force detection unit and the angle information of the angle detection unit.

Referring to Figures, the following description will discuss a robot, a controlling device and a controlling method for the robot and a controlling program for the robot-controlling device in accordance with one embodiment of the present invention in detail.

First, the following description will discuss a structure of a robot system 1 in accordance with one embodiment of the present invention. FIG. 1 is a view that schematically shows the structure of the robot system 1 in the embodiment of the present invention.

As shown in FIG. 1, a robot system 1 provided with a robot 5A having a robot arm 5 and its controlling device 4 in the embodiment of the present invention has its base end of the robot arm 5 placed on a wall face 91 near a working bench such as a kitchen or a table, and allows a hand 30 on the end of the robot arm 5 to hold, for example, one end 3a of an object 3 to be transported, with the other end 3b that is opposed to the end 3a of the object 3 being allowed to be held by a person 2 who works in cooperation with the robot arm 5 so that in this system, the person 2 and the hand 30 corresponding to the end of the robot arm 5 of the robot 5A transport the object 3 positioned between the person 2 and the robot 5A in cooperation with each other, with the object 3 being held therebetween. More specifically, while the hand 30 of the robot arm 5 grabs one end of an object 3 (a portion to be grabbed of the object 3 closer to the robot 5A with the object 3 being positioned between the person 2 and the robot 5A, for example, one handle 3a of a pan), the person 2 grabs the other end of the object 3 (a portion to be grabbed of the object 3 closer to the person 2 with the object 3 being positioned between the person 2 and the robot 5A, for example, the other handle 3b of the pan), and in this state, when the person 2 applies a force in a direction in which the object 3 is desirably carried, the robot arm 5 of the robot system 1 is allowed to move so that the object 3 can be transported by the robot arm 5 and the person 2 in cooperation with each other.

In the embodiment of the present invention, the object 3 includes a pan containing water or cooking materials, or a piece of tableware, or a heavy object such as furniture, and can also include an object the weight of which is changed on the way (for example, in a case where an empty pan is transported and water or cooking materials are put into the pan on the way), and an object to be handled that can be transported by the robot arm 5 and the person 2, while being held in cooperation with each other.

In the embodiment of the present invention, the base end of the robot arm 5 is placed on the wall face 91 near the work bench; however, in the case of an island kitchen without wall faces, it is placed at a position that is suitable for work, such as a ceiling face or a working side face of the island kitchen.

Figure 2:
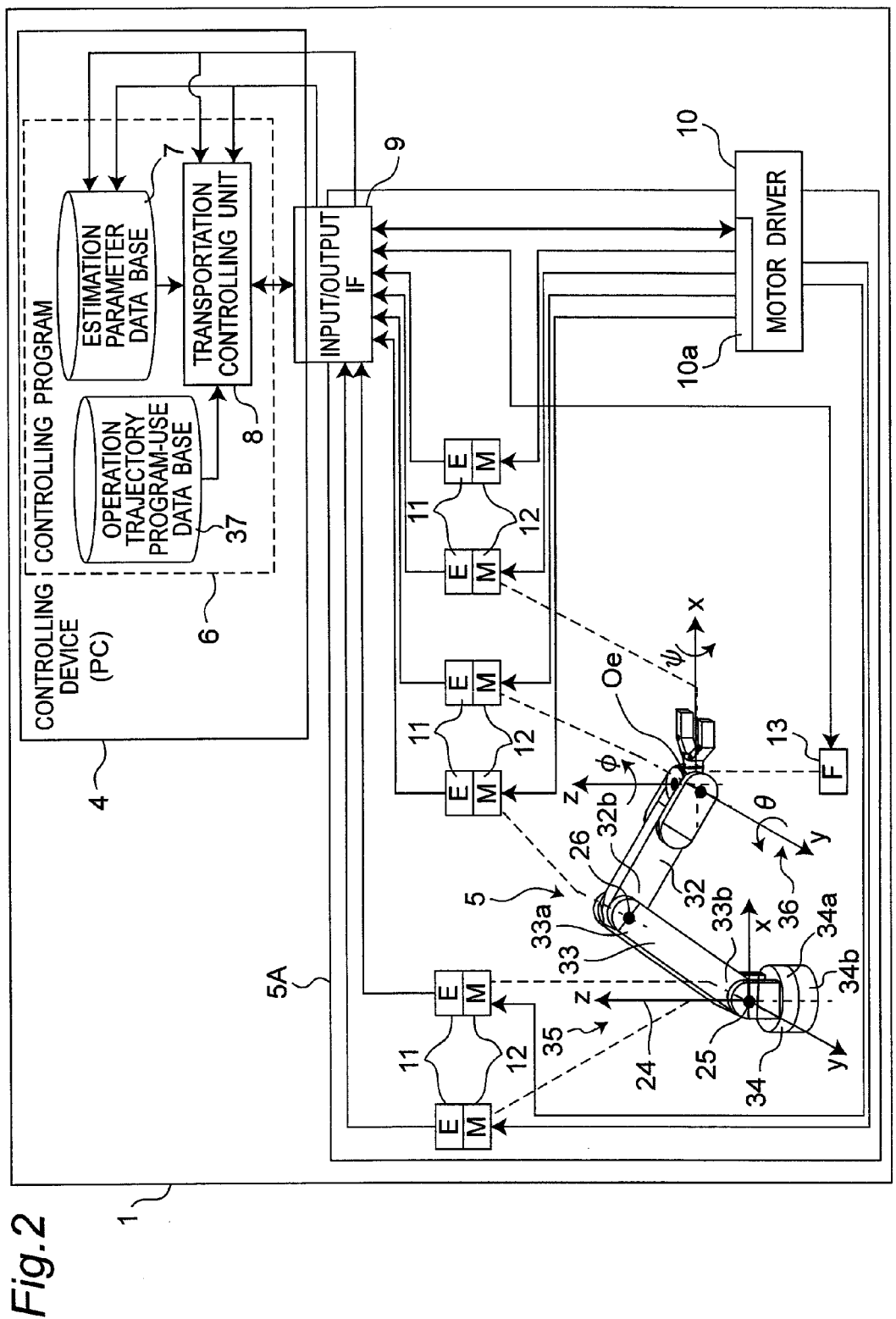
FIG. 2 is a view that shows specific structures of a robot-controlling device and a robot arm serving as a controlled object that form the robot system in accordance with the embodiment of the present invention.
Figure 4A:
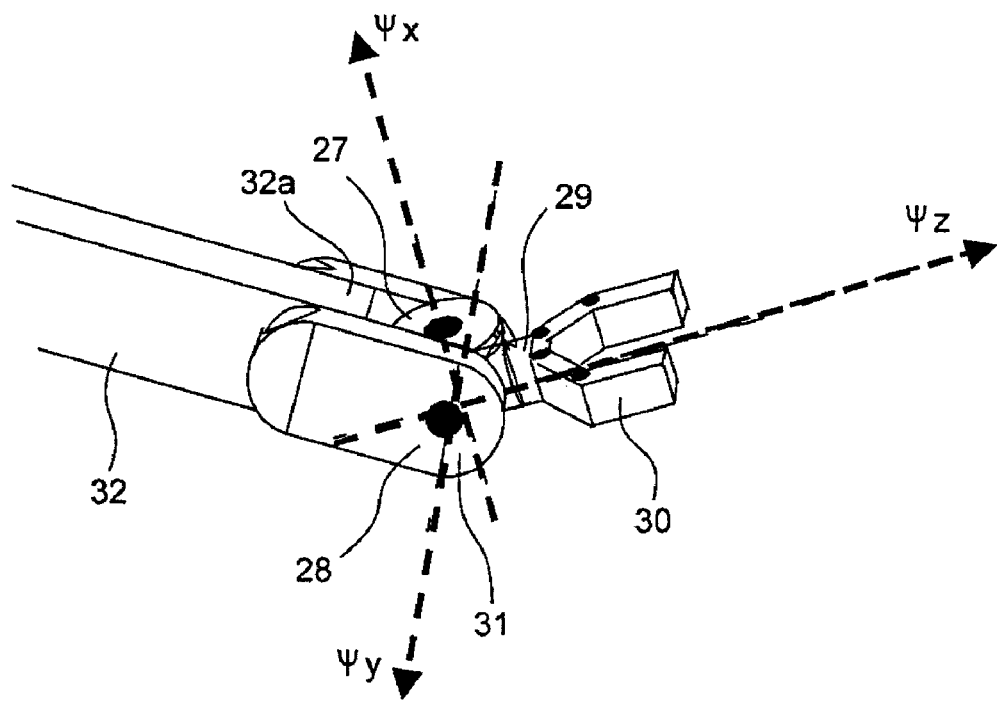
FIG. 4A is an explanatory view that shows symbols and the like in the hand of the robot arm to be controlled by the robot-controlling device in accordance with the embodiment of the present invention.

FIG. 2 is a view that shows specific structures of the controlling device 4 forming the robot system 1 and the robot arm 5 to be controlled. Moreover, FIG. 4A shows a fore arm link 32, a wrist portion 31 and a hand 30 in an enlarged manner.

Figure 3A:
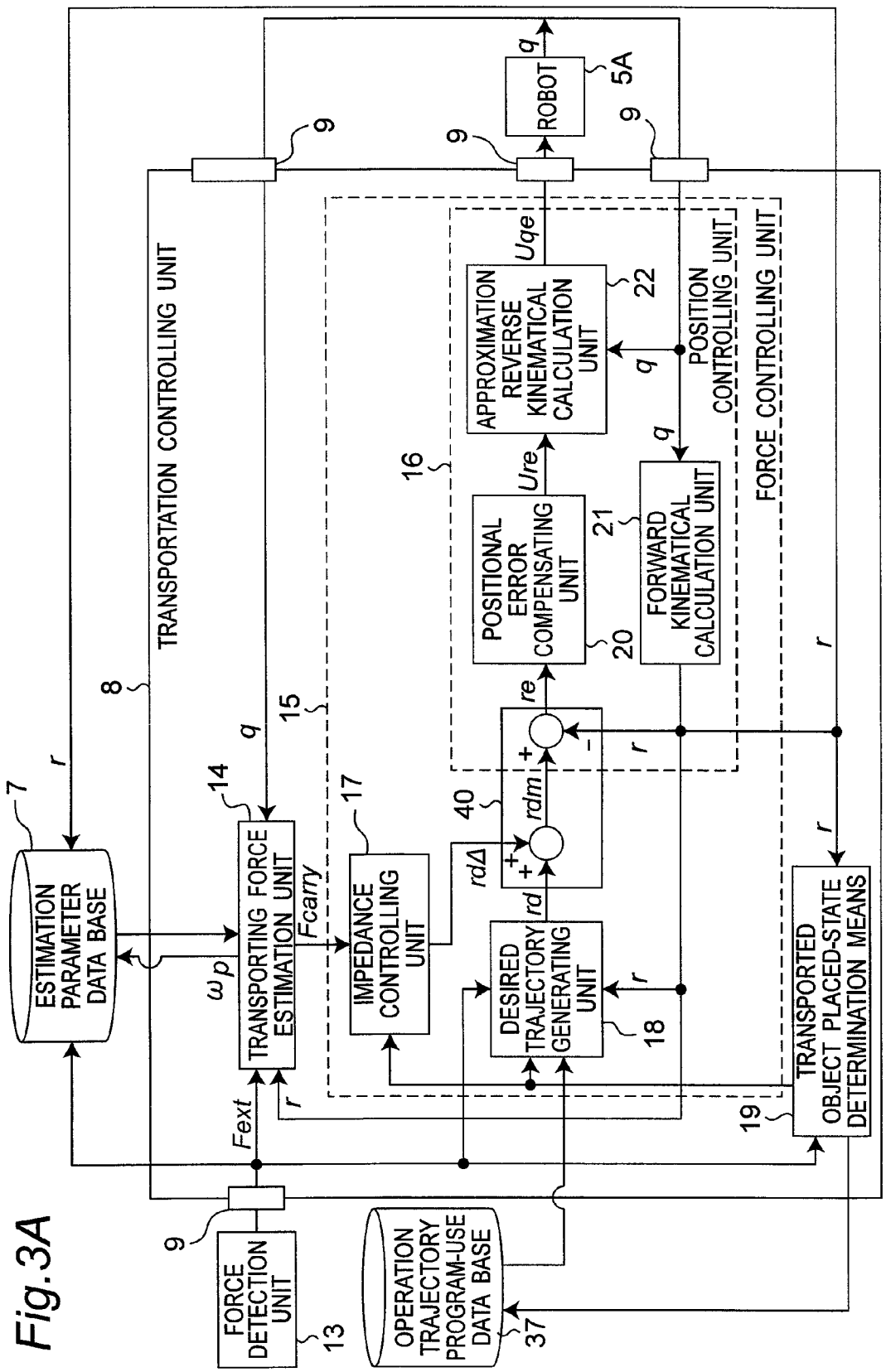
FIG. 3A is a control block diagram of the robot-controlling device in accordance with the embodiment of the present invention.
Figure 3B:
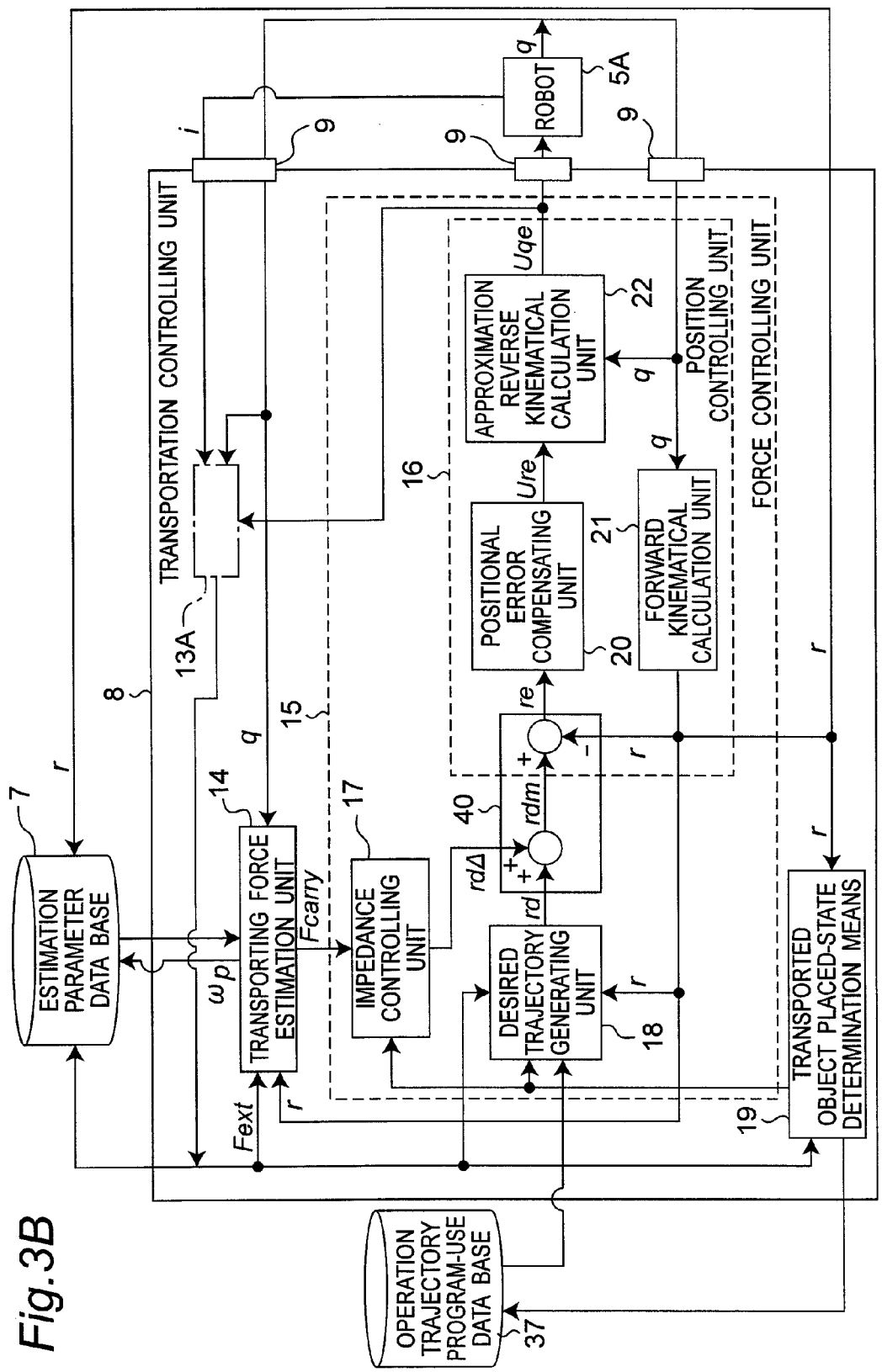
FIG. 3B is another control block diagram of the robot-controlling device in accordance with the embodiment of the present invention.

In the present embodiment, for example, the controlling device 4 is formed by a general personal computer, and the controlling device 4 is configured by an estimation parameter data base 7, an operation trajectory program-use data base 37 and a transportation controlling unit 8. Among these, the estimation parameter data base 7, the operation trajectory program-use data base 37 and the transportation controlling unit 8 may be formed as a controlling program 6, as shown in FIGS. 3A and 3B.

An input/output IF (interface) 9 is designed to be provided with, for example, a D/A board, an A/D board and a counter board that are connected to an expansion slot, such as a PCI bus of the personal computer.

The controlling device 4 is connected to a motor driver 10 that drives respective link manipulators of the robot arm 5 through the input/output IF 9 serving as one example of an input unit, and sends a control signal to the motor driver 10.

When the controlling device 4 for controlling operations of the robot arm 5 is operated, respective pieces of joint angle information outputted from encoders 11 to be described later of respective joint portions of the robot arm 5, and force information exerted on the end (hand 30) of the robot arm 5 that is outputted from a force detection unit 13 to be described later that detects force information, are acquired by the controlling device 4 through the counter board of the input/output IF 9, and based upon the respective pieces of joint angle information and force information thus acquired, the controlling device calculates control instruction values for rotation operations of the respective joint portions. The respective control instruction values thus calculated are given to the motor driver 10 for drive-controlling the respective joint portions of the robot arm 5 through the D/A board of the input/output IF 9, and in accordance with the control instruction values sent from the motor driver 10, motors 12 of the respective joint portions of the robot arm 5 are driven. The motor driver 10 and motors 12 function as one example of a driving unit. Moreover, the encoders 11 function as one example of an angle detection unit that outputs angle information.

The robot arm 5 is prepared as, for example, a multi-link manipulator having six degrees of freedom, and has a hand 30, a fore arm link 32 with a wrist portion 31 to which the hand 30 is attached being installed to its end, an upper arm link 33 that has a tip end rotatably coupled to the base end of the fore arm link 32 and a base portion 34 to which the base end of the upper arm link 33 is rotatably coupled and supported, and which is secured to a wall face 91.

The wrist portion 31 has three rotation axes for a fourth joint portion 27, a fifth joint portion 28 and a sixth joint portion 29 so that relative orientations (directions) of the hand 30 to the fore arm link 32 can be changed. That is, in FIGS. 2 and 4A, the fourth joint portion 27 can change the orientation of the hand 30 relative to the wrist portion 31 around an $\psi_x$ axis (longitudinal axis). The fifth joint portion 28 can change the orientation of the hand 30 relative to the wrist portion 31 around a $\psi_y$ axis (lateral axis) orthogonal the $\psi_x$ axis of the fourth joint portion 27. The sixth joint portion 29 can change the orientation of the hand 30 relative to the wrist portion 31 around a $\psi_z$ axis (lateral axis) that is respectively orthogonal to the $\psi_x$ axis of the fourth joint portion 27 and the $\psi_y$ axis of the fifth joint portion 28. That is, the hand 30 is allowed to rotate relative to one end 32a of the fore arm link 32 in three axis directions of the $\psi_x$ axis, the $\psi_y$ axis and the $\psi_z$ axis, independently. In this case, the $\psi_x$ axis, the $\psi_y$ axis and the $\psi_z$ axis are coordinate axes that are respectively orthogonal to one another. Moreover, in FIG. 2, the hand coordinate system 36, which will be described later, are not necessarily made coincident with the $\psi_x$ axis, the $\psi_y$ axis and the $\psi_z$ axis.

The other end 32b of the fore arm link 32 is allowed to rotate around the third joint portion 26 relative to one end 33a of the upper arm link 33. In the embodiment, to be allowed to rotate around the third joint portion 26 refers to the fact that it is allowed to rotate around the lateral axis in parallel with the $\psi_y$ axis of the fifth joint portion 28. The other end 33b of the upper arm link 33 is allowed to rotate around the second joint portion 25 relative to the base portion 34. In the embodiment, to be allowed to rotate around the second joint portion 25 refers to a face that it is allowed to rotate around a lateral axis in parallel with the $\psi_y$ axis (lateral axis of the third joint portion 26) of the fifth joint portion 28. An upper-side movable portion 34a of the base portion 34 is allowed to rotate around the first joint portion 24 relative to the lower-side securing unit 34b of the base portion 34. In the present embodiment, to be allowed to rotate around the first joint portion 24 refers to the fact that it is allowed to rotate around the z-axis of the absolute coordinate system 35.

As a result, the robot arm 5 is made rotatable around the respective six axes from the first joint portion 24 to the sixth joint portion 29 independently, so that it forms a multi-link manipulator having six degrees of freedom.

Each of the joint portions forming the rotation portions of the respective axes is provided with a motor 12 (which is actually installed inside each of the joint portions of the robot arm 5) serving as one example of a rotation driving device that is installed in one member of paired members that form each joint portion (for example, a rotation-side member and a supporting-side member that supports the rotation-side member), and drive-controlled by a motor driver 10, which will be described later, and an encoder 11 that detects the rotation phase angle (that is, the joint angle) of the rotation axis of the motor 12 (actually, disposed inside each of the joint portions of the robot arm 5). Therefore, the rotation axis of the motor 12 installed in one of the members forming each of the joint portions is connected to the other member of the joint portion so that, since the rotation axis is forwardly or reversely rotated, the other member is allowed to rotate around each of the axes relative to the one of the members.

Figure 4B:
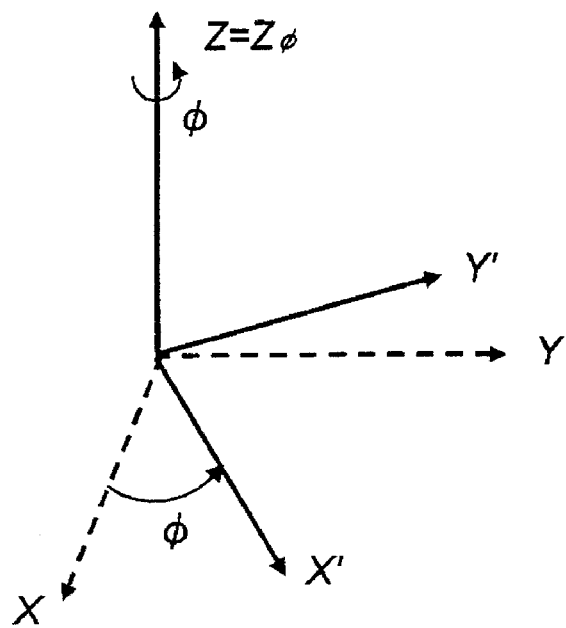
FIG. 4B is an explanatory view that shows a roll angle, a pitch angle and a yaw angle in the end of the robot arm to be controlled by the robot-controlling device in accordance with the embodiment of the present invention.
Figure 4C:
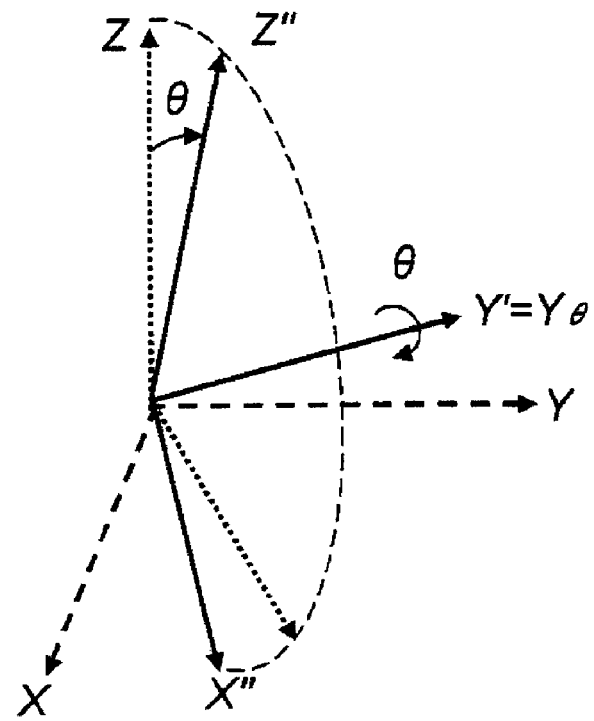
FIG. 4C is another explanatory view that shows a roll angle, a pitch angle and a yaw angle in the hand of the robot arm to be controlled by the robot-controlling device in accordance with the embodiment of the present invention.
Figure 4D:
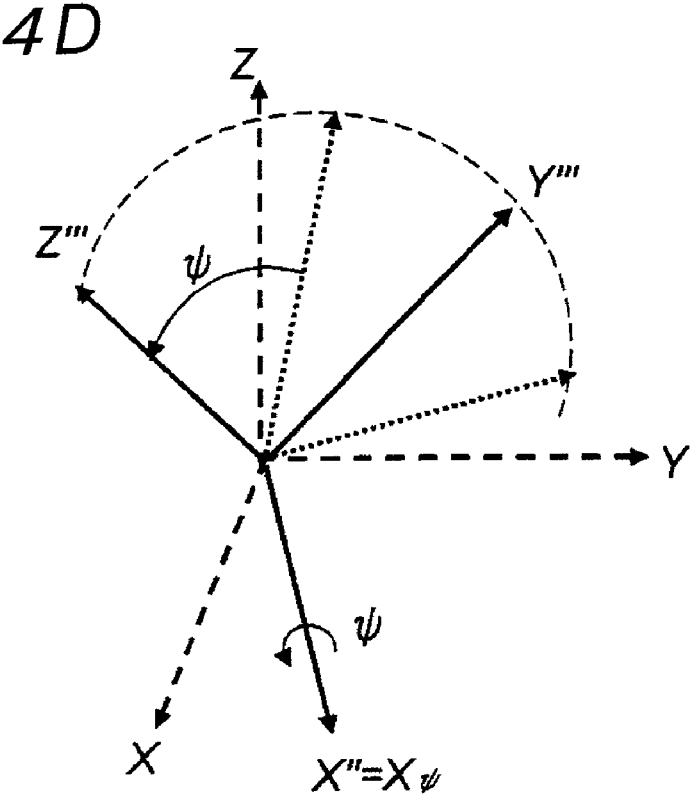
FIG. 4D is the other explanatory view that shows a roll angle, a pitch angle and a yaw angle in the hand of the robot arm to be controlled by the robot-controlling device in accordance with the embodiment of the present invention.

Reference numeral 35 represents an absolute coordinate system in which the relative positional relationship is fixed relative to the lower-side securing unit 34b of the base member 34, and 36 represents a hand coordinate system in which the positional relationship is fixed relative to the hand 30. The origin position $O_e$ (X, Y, Z) of the hand coordinate system 36 viewed from the absolute coordinate system 35 is defined as a position of the hand 30 (that is, the hand position) of the robot arm 5. Moreover, the orientation of the hand coordinate system 36, viewed from the absolute coordinate system 35, is represented by coordinates ($\phi$, $\theta$, $\psi$) in which the roll angle, pitch angle and yaw angle are used. These coordinates ($\phi$, $\theta$, $\psi$) are defined as the hand orientation (the orientation of the hand 30) of the robot arm 5, and the hand position and orientation vectors are defined as vectors r=[x, y, z, $\phi$, $\theta$, $\psi$]$^T$. Referring to FIGS. 4B to 4D, the following description will discuss the roll angle, pitch angle and yaw angle. Supposing a coordinate system in which the coordinate system is rotated by an angle $\theta$ relative to the Z-axis of the absolute coordinate system 35 serving as a rotation axis (see FIG. 4B). The coordinate axes at this time are defined as [X', Y', Z]. Next, this coordinate system is rotated by an angle $\theta$ with Y' serving as the rotation axis (see FIG. 4C). The coordinate axes at this time are defined as [X", Y', Z"]. Lastly, this coordinate system is rotated by an angle $\psi$ with X" serving as the rotation axis (see FIG. 4D). The orientation of the coordinate system at this time is represented by roll angle $\phi$, pitch angle $\theta$ and yaw angle $\psi$, and the orientation vectors at this time are defined as ($\phi$, $\theta$, $\psi$). When a coordinate system, formed by parallel-shifting the origin position of the coordinate system of the orientation ($\phi$, $\theta$, $\psi$) to the origin position $O_e$ (x, y, z) of the hand coordinate system 36, is coincident with the hand coordinate system 36, the orientation vectors of the hand coordinate system are defined as ($\phi$, $\theta$, $\psi$).

In an attempt to control the hand position and orientation of the robot arm 5, the hand position and orientation vectors r are made to follow hand position and orientation desired vectors $r_d$ generated in a desired trajectory generating unit 18, which will be described later, by using the transportation controlling unit 8.

The force detection unit 13 detects or estimates a force generated between the hand 30 of the robot arm 5 and a transported object 3, and outputs the corresponding information. For example, the force detection unit 13 can be a force sensor having 6 axes, located between the hand 30 and the wrist portion 31; however, this may have 6 axes or less, in such a case when the transporting directions of the object 3 are limited. However, it is necessary to provide a means or a device that can always detect at least a force exerted in the vertical direction. The output from the force detection unit 13 is given to the estimation parameter data base 7, a transporting force estimation unit 14, the desired trajectory generating unit 18 and a transported article placed-state determination unit (transported object placed-state determination unit) 19.

Moreover, as another example of the force detection unit 13, a force estimation unit (for example, see 13A of FIG. 3B) that estimates the force from a motor current value or the like, without using a sensor, may be used. In this case, the estimation of an external force by the force detection unit 13 (force estimation unit 13A) is carried out by the following method. The electric current sensor 10a of the motor driver 10 measures each of values i [$i_1$, $i_2$, $i_3$, $i_4$, $i_5$, $i_6$]$^T$ of currents that flow through the motor 12 that drives the respective joint portions of the robot arm 5. Each of the current values i [$i_1$, $i_2$, $i_3$, $i_4$, $i_5$, $i_6$]$^T$ measured by the electric current sensor of the motor driver 10 is taken up by the force detection unit 13 (force estimation unit 13A) through the A/D board of the input/output IF 9. Moreover, a current value q of the joint angle is taken up by the force detection unit 13 (force estimation unit 13A) through the counter board of the input/output IF 9, and a joint angle error compensating output $u_{qe}$, given from an approximation reverse kinematical calculation unit 22 that will be described later, is taken up by the force detection unit 13 (force estimation unit 13A).

The force detection unit 13 (force estimation unit 13A), which functions as an observer, calculates a torque $\tau_{ext}$ that is exerted in each of the joint portions by an external force applied to the robot arm 5, based upon the respective pieces of information, that is, the electric current value i, the current value q of the joint angle and the joint angle error compensating output $u_{qe}$. Moreover, the force detection unit 13 (force estimation unit 13A) also converts the torque to an equivalent hand external force $F_{ext}$ of the hand of the robot arm 5, based upon $F_{ext} = J_v(q)^{-T}\tau_{ext}$, and outputs the force $F_{ext}$ thus converted to the estimation parameter data base 7, the transporting force estimation unit 14, the desired trajectory generating unit 18 and the transported object placed-state determination unit 19. In this case, $J_v(q)$ is a Jacob matrix that satisfies the following equation:

[Equation 1]

$$v = Jv(q)\dot{q} \quad \text{equation (1)}$$

where $v=[v_x, v_y, v_z, \lambda_x, \lambda_y, \lambda_z]^T$, and $(v_x, v_y, v_x)$ represent a translation speed of the hand of the robot arm 5 in the hand coordinate system 36, while $(\lambda_x, \lambda_y, \lambda_z)$ represents an angular velocity of the hand of the robot arm in the hand coordinate system 36.

FIGS. 3A and 3B show a specific structure of the transportation controlling unit 8. The transportation controlling unit 8 is configured by the transporting force estimation unit 14, the force controlling unit 15 and the transported object placed-state determination unit 19. The force controlling unit 15 is configured by an impedance controlling unit 17, a positional error calculation unit 40, a position controlling unit 16 and the desired trajectory generating unit 18. Moreover, the position controlling unit 16 is configured by a positional error compensating unit 20, a forward kinematical calculation unit 21 and the approximation reverse kinematical calculation unit 22 so that an instruction value of the robot arm 5 is outputted by the position controlling unit 16 based upon the desired trajectory of the robot arm 5 as well as the current position and orientation of the robot arm 5. Additionally, in addition to the above-mentioned method, the force controlling system may be designed by using another force controlling method such as a hybrid controlling method.

The current value (joint angle vectors) vectors $q=[(q_1, q_2, q_3, q_4, q_5, q_6]^T$ of each joint angle, measured by the encoder 11 of each of the joint portions, are outputted from the robot arm 5, and are taken up by the transportation controlling unit 8 through the counter board of the input/output IF 9. In this case, $q_1, q_2, q_3, q_4, q_5$, and $q_6$ represent joint angles of the first joint portion 24, the second joint portion 25, the third joint portion 26, the fourth joint portion 27, the fifth joint portion 28 and the sixth joint portion 29 that are detected by the encoders 11.

The desired trajectory generating unit 18 outputs hand position and orientation desired vectors $r_d$ used for achieving desired actions of the robot arm 5 based upon the hand position and orientation vectors r, the operation trajectory program-use data base 37, force information from the force detection unit 13 and transported object placed-state determination information from the transported object placed-state determination unit 19, which will be described later. In a case where a positional controlling operation is carried out along a predetermined trajectory, the desired actions of the robot arm 5 are preliminarily given to an operation trajectory program stored in the operation trajectory program-use data base 37 as positions $(r_{d0}, r_{d1}, r_{d2}, \ldots)$ at respective points of time $(t=0, t=t_1, t=t_2, \ldots)$ in accordance with desired operations, and the desired trajectory generating unit 18 utilizes polynomial interpolation based upon information of the positions $(r_{d0}, r_{d1}, r_{d2}, \ldots)$ at respective points of time $(t=0, t=t_1, t=t_2, \ldots)$ from the operation trajectory program-use data base 37, and the hand position and orientation vectors r to interpolate the trajectory between the respective points so that the hand position and orientation desired vectors $r_d$ are generated. Moreover, in a case where a force controlling operation is carried out, by stopping the updates of the hand position and orientation desired vectors $r_d$ from the start of the force controlling operation, the force controlling operation is achieved by hand position and orientation desired correcting outputs $r_{d\Delta}$, which will be described later. Additionally, in an attempt to carry out a force controlling operation on one portion of the position and the orientation, by stopping the update of only the component to be force-controlled, the controlling operation is achieved.

The impedance controlling unit 17 is a unit that allows the robot arm 5 to achieve the control of the mechanical impedance value of the robot arm 5 to a mechanical impedance set value, and to this is inputted transported object placed-state determination information from the transported object placed-state determination unit 19, and the impedance controlling unit 17 also calculates the hand position and orientation desired correcting outputs $r_{d\Delta}$ used for controlling the mechanical impedance value of the robot arm 5 to the mechanical impedance set value based upon the following equation (2), from inertia M, viscosity D, and rigidity K that are impedance parameters preliminarily set through experiments and a transporting force $F_{carry}$ outputted from the transporting force estimation unit 14, and outputs the resulting data to the position controlling unit 16. The hand position and orientation desired correcting outputs $r_{d\Delta}$ are added to the hand position and orientation desired vectors $r_d$ outputted by the desired trajectory generating unit 18 by the positional error calculation unit 40 so that hand position and orientation correcting desired vectors $r_{dm}$ are generated.

[Equation 2]

$$r_{d\Delta}=(s^2\hat{M}+s\hat{D}+\hat{K})^{-1}F_{carry} \qquad \text{equation (2)}$$

where the following matrixes are satisfied, with serving as an operator.

[Equation 3]

$$\hat{M} = \begin{bmatrix} M & 0 & 0 & 0 & 0 & 0 \\ 0 & M & 0 & 0 & 0 & 0 \\ 0 & 0 & M & 0 & 0 & 0 \\ 0 & 0 & 0 & M & 0 & 0 \\ 0 & 0 & 0 & 0 & M & 0 \\ 0 & 0 & 0 & 0 & 0 & M \end{bmatrix} \qquad \text{equation (3)}$$

[Equation 4]

$$\hat{D} = \begin{bmatrix} D & 0 & 0 & 0 & 0 & 0 \\ 0 & D & 0 & 0 & 0 & 0 \\ 0 & 0 & D & 0 & 0 & 0 \\ 0 & 0 & 0 & D & 0 & 0 \\ 0 & 0 & 0 & 0 & D & 0 \\ 0 & 0 & 0 & 0 & 0 & D \end{bmatrix} \qquad \text{equation (4)}$$

[Equation 5]

$$\hat{K} = \begin{bmatrix} K & 0 & 0 & 0 & 0 & 0 \\ 0 & K & 0 & 0 & 0 & 0 \\ 0 & 0 & K & 0 & 0 & 0 \\ 0 & 0 & 0 & K & 0 & 0 \\ 0 & 0 & 0 & 0 & K & 0 \\ 0 & 0 & 0 & 0 & 0 & K \end{bmatrix} \qquad \text{equation (5)}$$

The joint angle vectors q, which are current values q of the joint angles measured by the encoders 11 of the respective joint portions of the robot arm 5, are inputted to the forward kinematical calculation unit 21 through the counter board of the input/output IF 9. Moreover, in the forward kinematical calculation unit 21, geometrical calculations are carried out to convert the joint angle vectors q of the robot arm 5 to the hand position and orientation vectors r. Therefore, the forward kinematical calculation unit 21 functions as one example of a hand position detection unit that detects the hand position of the robot arm 5. The hand position and orientation vectors r, calculated in the forward kinematical calculation unit 21, are outputted to the desired trajectory generating unit 18, the transported object placed-state determination unit 19, the positional error compensating unit 20 and the transporting force estimation unit 14.

An error $r_e$ ($=r_{dm}-r$) between the hand position and orientation vectors r calculated by the forward kinematical calculation unit 21 from the joint angle vectors q measured in the robot arm 5 and the hand position and orientation correcting desired vectors $r_{dm}$, is inputted to the positional error compensating unit 20, and a positional error compensating output $u_{re}$ is outputted from the positional error compensating unit 20 to the approximation reverse kinematical calculation unit 22.

Based upon the positional error compensating output $u_{re}$ inputted from the positional error compensating unit 20 and the joint angle vector q measured in the robot arm 5, the approximation reverse kinematical calculation unit 22 carries out approximation calculations of reverse kinematics by using an approximation $u_{out}=J_r(q)^{-1}u_{in}$. In this case, $J_r(q)$ is a Jacob matrix that satisfies the following equation, $u_{in}$ is an output to the approximation reverse kinematical calculation unit 22, and $u_{out}$ is an output from the approximation reverse kinematical calculation unit 22, and supposing that the input $u_{in}$ is a joint angle error $q_e$, a conversion equation from the hand position and orientation error $r_e$ to the joint angle error $q_e$, as represented by $q_e=J_r(q)^{-1}r_e$, is obtained. Therefore, when the positional error compensating output $u_{re}$ is inputted to the approximation reverse kinematical calculation unit 22 from the positional error compensating unit 20, a joint angle error compensating output $u_{qe}$ for use in compensating the joint angle error $q_e$ is outputted from the approximation reverse kinematical calculation unit 22 to the motor driver 10 of the robot 5A as an output from the approximation reverse kinematical calculation unit 22.

[Equation 6]

$$\dot{r}=J_r(q)\dot{q}$$

The joint angle error compensating output $u_{qe}$ is given to the motor driver 10 of the robot 5A through the D/A board of the input/output IF9 as a voltage instructing value, and each of the joint portions is consequently driven to forward/reverse rotate by each of the motors 12 so that the robot arm 5 is operated.

With respect to the impedance controlling unit 17 configured as described above, the following description will discuss a principle of the impedance-controlling operation of the robot arm 5.

The impedance controlling operation basically corresponds to a feed-back controlling (position-controlling) operation of the hand position and orientation error $r_e$ by the positional error compensating unit 20, and as shown in FIGS. 3A and 3B, a portion, surrounded by a dotted line and indicated by reference numeral 16, corresponds to a position controlling unit 16. For example, when a PID compensator is used as the positional error compensating unit 20, a controlling operation is executed by the positional controlling unit 16 so that the hand position and the orientation error $r_e$ are converged to 0; thus, it becomes possible to achieve a desired impedance controlling operation of the robot arm 5.

Figure 5:
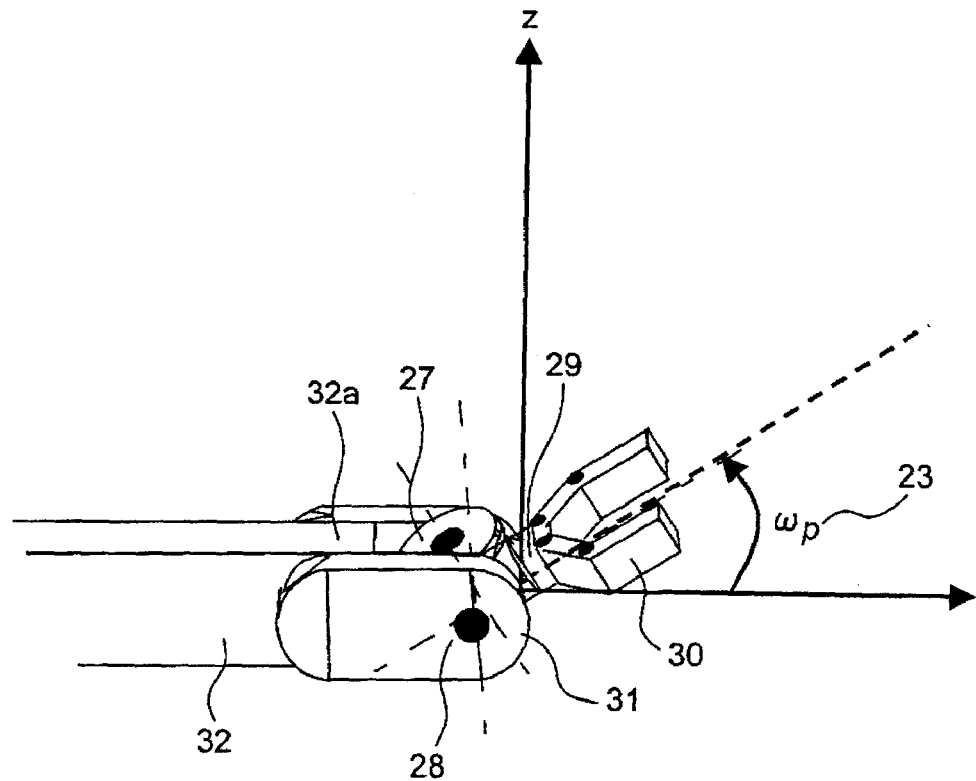
FIG. 5 is an explanatory view that shows symbols and the like in the hand of the robot arm to be controlled by the robot-controlling device in accordance with the embodiment of the present invention.
Figure 6A:
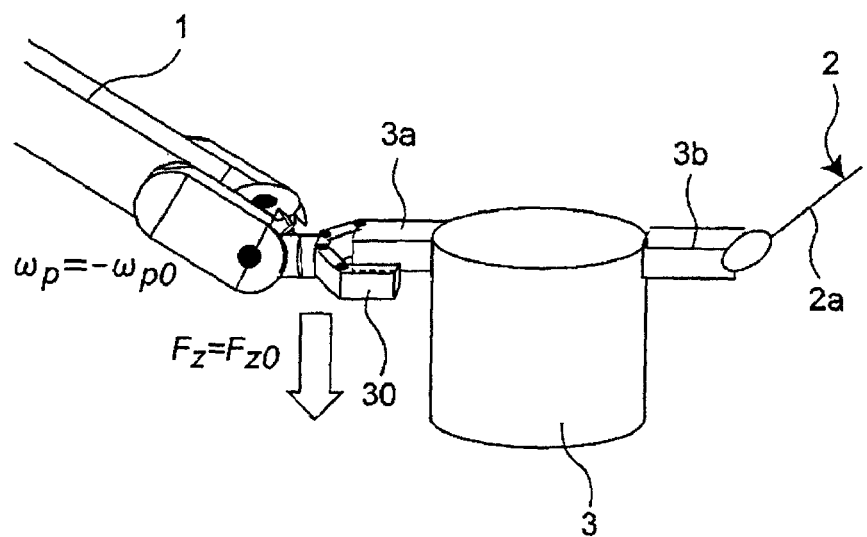
FIG. 6A is a view that shows an object transporting state in cooperation with the robot arm and a person in the embodiment of the present invention.
Figure 6B:
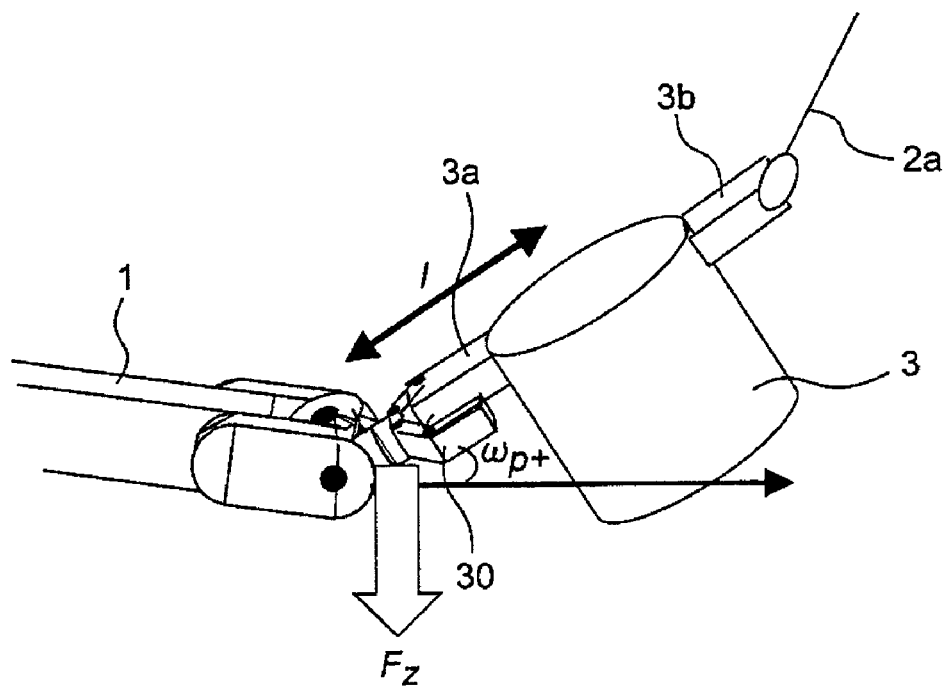
FIG. 6B is another view that shows an object transporting state in cooperation with the robot arm and a person in the embodiment of the present invention.

The transporting force estimation unit 14 estimates a transporting force $F_{carry}$ required for a cooperative transporting operation between the robot arm 5 and the person 2 from the output information from the estimation parameter data base 7, the output information from the force detection unit 13 and the orientation information q of the hand of the robot arm 5, that is, the joint angle date (joint variable vectors or joint angle vectors q). Referring to FIGS. 5 and 6A to 6B, the following description will discuss one example thereof. In FIG. 5, $\omega_p$, indicated by reference numeral 23, is an angle made by the hand of the robot arm 5 relative to a horizontal face, and represents an angle determined from the hand position and the orientation vectors r by the estimation parameter data base 7. In this case, in this angle $\omega_p$, the direction of an arrow of FIG. 5 (anticlock wise direction) is defined as positive. As shown in FIG. 6A, in a case where both of handles 3a and 3b of an object 3 are respectively supported by the arm 2a of the person 2 and the robot arm 5, a force in the vertical direction to be detected by the force detection unit 13 is defined as $F_z$ ($\leqq 0$). With respect to the orientation of the force $F_z$ in the vertical direction, the direction of the z-axis of the absolute coordinate system 35 of FIG. 2 is defined as positive. At this time, the input in the vertical direction of the force control (a component in the vertical direction of the input of the force control from the transporting force estimation unit 14 to the force controlling unit 15) is represented by the following expression:

[Expression 7]

$$(-k_p F_z + k_\omega \omega_p) \qquad \text{expression (7)}$$

In this expression, for example, $k_p$ and $k_\omega$ are parameters to be determined by the value of the force $F_z$ in the vertical direction detected by the force detection unit and the positive/negative sign of the value of the angle $\omega_p$, made by the hand of the robot arm 5 relative to the horizontal face, that is, parameters (coefficients) to be determined by the value of the force $F_z$ in the vertical direction detected by the force detection unit 13 and the positive/negative sign of the value of the angle $\omega_p$, made by the hand of the robot arm 5 relative to the horizontal face. Additionally, $k_p$ and $k_\omega$ may be parameter-set as finer values of the angle value $\omega_p$ without depending on the positive/negative sign of the value of the angle $\omega_p$, and may be widely defined as parameters that are uniquely determined from the force $F_z$ in the vertical direction and the angle $\omega_p$.

As shown in FIG. 6A, in a case where $-k_p F_{z0} + (-k_\omega \omega_{p0})=0$ holds, since the input of the force control becomes 0, this state forms a balanced point to allow the robot arm 5 to stop. In this case, $\omega_{p0}$ represents an angle of the hand of the robot arm 5 relative to the horizontal face in a case where, as shown in FIG. 6A, the object 3 is held by the person 2, and the object 3 is balanced and maintained between the robot arm 5 and the person 2. Moreover, $F_{z0}$ represents a force in the vertical direction of the hand of the robot arm 5 in the case where, as shown in FIG. 6A, the object 3 is held by the person 2 with balanced and maintained between the robot arm 5 and the person 2.

Figure 6C:
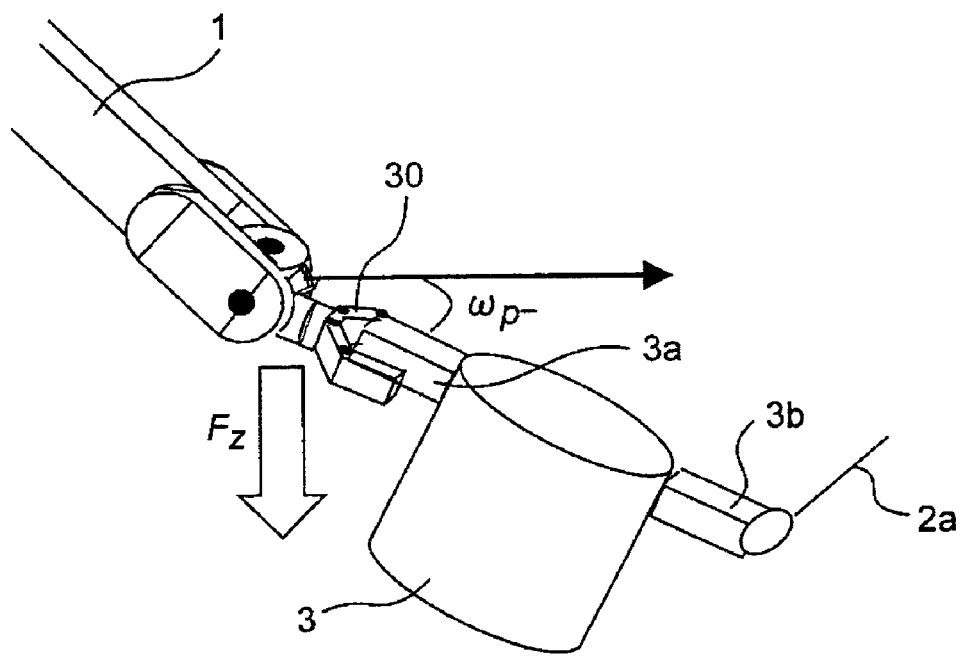
FIG. 6C is still another view that shows an object transporting state in cooperation with the robot arm and a person in the embodiment of the present invention.

Suppose that, as shown in FIG. 6B, the person 2 raises one handle 3b of the object 3 upward from the balanced state shown in FIG. 6A to form a state of $\omega_p=\omega_{p+}$ (a state in which the person 3 raises the handle 3b of the object 3 by an angle $\omega_{p+}$ relative to the horizontal face)). At this time, an inequality $-k_p F_z + k_\omega \omega_{p+} > 0$ holds so that the input in the vertical direction of the force control is made upward so that the robot arm 5 is raised. In contrast, suppose that, as shown in FIG. 6C, the person 2 increases the downward force from the balanced state shown in FIG. 6A to form a state of $\omega_p=\omega_{p-}$ (a state in which the person 3 lowers the handle 3b of the object 3 by an angle $\omega_{p-}$ relative to the horizontal face). At this time, an inequality $-k_p F_z + k_\omega \omega_{p-} < 0$ holds so that the input in the vertical direction of the force control is made downward so that the robot arm 5 is lowered.

As described above, in the transporting force estimation unit 14, by using the expression (7) to form the input in the vertical direction of the force control, the robot arm 5 is allowed to move in an upward or downward direction desired by the person 2 in cooperation with the person 2 so that a cooperative transporting operation of the object 3 between the robot arm 5 and the person 2 can be realized. Moreover, this technique does not preliminarily require the mass information of the object 3 to be transported. Furthermore, when the weight of the object 3 is changed, the force $F_z$ in the vertical direction to be detected by the force detection unit 13 is also changed. As a result, in the case where the weight of the object 3 is increased, the robot arm 5 increases the upward force, while, in a case where the weight of the object 3 is decreased, the robot arm 5 decreases the upward force, so that even when the weight of the object 3 is changed, the cooperative transporting operation can be carried out without causing any problems.

In a case where the variations in the weight of the transporting object 3 are comparatively small (for example, in a case where a threshold value of a variation width of the weight of the object 3 is preliminarily set to 5 kg, if the weight of the object to be transported is 5 kg or less) (in other words, if an weight variation of the object 3 is so small as to be absorbed by the person 2 side), $k_p=0$ may be set in the above-mentioned expression (7), and only $k_\omega \omega_p$ may be used. In general, since the output of the force detection unit 13 has noise, by using only $k_\omega \omega_p$ (that is, by eliminating the cause of noise), it becomes possible to reduce vibration factors caused by noise.

Figures 6D, 7:
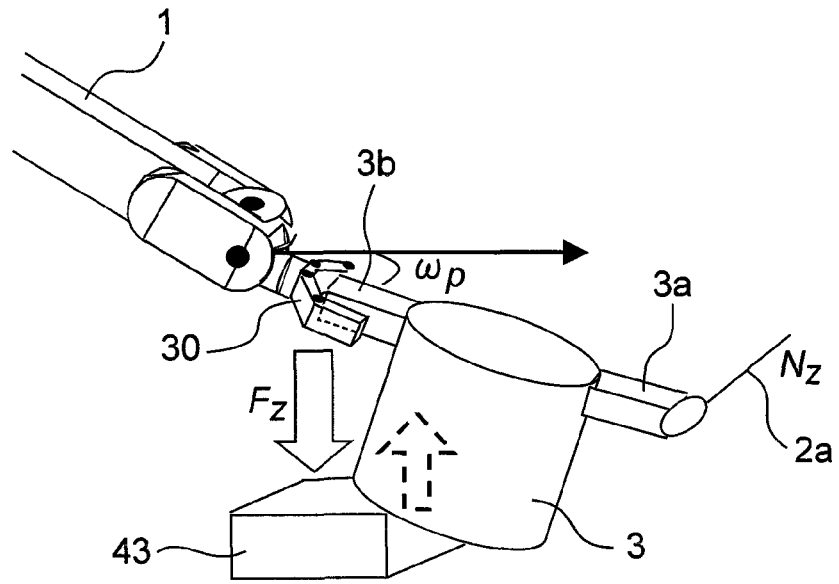
FIG. 6D is the other view that shows an object transporting state in cooperation with the robot arm and a person in the embodiment of the present invention.
FIG. 7 is a view that shows one example of an estimation parameter data base as a table in the robot-controlling device in accordance with the embodiment of the present invention.

In a case where, as shown in FIG. 6D, below the object 3 to be transported or the hand 30 of the robot arm 5, the object 3 and an object 43 that interferes with the object 3 to be transported are located, a force $$N_z$$ [Expression 8]

exerted between the object 3 to be transported and the interfering object 43, makes the downward force $F_z$ in the vertical direction to be received by the robot arm 5 close to 0 (for example, to about 0.5 N).

In the case of no interfering object 43, the weight of the object 3 to be imposed on the robot arm 5 is always detected as a downward force in the vertical direction. If the force $F_z$ in the vertical direction detected by the force detection unit 13 is greater than 0, the transporting force estimation unit 14 determines that there is an interfering object 43 below the object 3 to be transported or the hand 30 of the robot arm 5, and for the purpose of safety, the transporting force estimation unit 14 outputs the force in the vertical direction detected by the force detection unit 13, as it is. With this arrangement, it is possible to prevent the object 3 to be transported or the hand 30 of the robot arm 5 from being pressed onto the interfering object 43.

Based upon these, supposing that the force in the vertical direction detected by the force detection unit 13 is $F_z$ and that, by taking into consideration the influences from noise or error of the force detection unit 13, a threshold value to be used for making a switch as to whether or not the influences from the noise or error should be taken into consideration is set to $-\epsilon$ (in this case however, a distance between the object 3 and the hand 30 of the robot arm 5 is relatively unchangeable because of the holding state, such as chucking, of the object 3 by the hand 30 in the transporting force estimation unit 14, the transporting force in the vertical direction, indicated by the following expression 9, $$\hat{F}_z$$ [Expression 9]

is represented by the following equation (8):

[Equation 10]

$$\begin{cases} \hat{F} = -k_p F_z + k_\omega \omega_p & \text{if } F_z \leq -\varepsilon \\ \hat{F} = F_z & \text{if } F_z > -\varepsilon \end{cases}$$ equation (8)

The force that is varied by the weight of the object 3 is given as a force in the vertical direction and a torque exerted around the pitch axis (see FIGS. 4B to 4D); therefore, with respect to forces other than this, the force detected by the force detection unit 13, as it is, is outputted from the transporting force estimated unit 14. Supposing that the forces of the six axes, detected by the force detection unit 13, are represented by the following equation, $$F_{est}=[F_x F_y F_z F_\phi F_\theta F_\psi]^T$$ [Equation 11]

the output of the transporting force estimation unit 14 is represented by the following equation (9):
[Equation 12]

$$F_{carry}=[F_x F_y \hat{F} F_\phi l \cdot \hat{F} F_\psi]^T$$ equation (9)

where
[Expression 13]
"l" represented by the following manner corresponds to a distance from the hand of the robot arm 5 to the center of gravity of the object 3 to be transported.

Based upon the output information $F_z$ of the force detection unit 13 and the orientation information $\omega_p$ of the hand of the robot arm 5, the estimation parameter data base 7 selects parameters $k_p$ and $k_\omega$ respectively on demand, and outputs the resulting parameter to the transporting force estimation unit 14.

FIG. 7 shows one example of the estimation parameter data base 7. In the estimation parameter data base 7, the values of the parameters $k_p$ and $k_\omega$ are respectively set preliminarily, and stored in association with combinations of the vertical component $F_z$ of the force preliminarily exerted in the hand of the robot arm 5 and the angle $\omega_p$ made by the hand of the robot arm 5 relative to the horizontal face. Therefore, upon inputs of the pieces of information of the vertical component of the force and the angle $\omega_p$ to the estimation parameter data base 7, values of the parameters $k_p$ and $k_\omega$ are respectively outputted from the estimation parameter data base 7. For example, when $F_z=-10$ and $\omega_p=0.1$ (that is, $\omega_p$ is positive), $k_p=0.52$ and $k_\omega=32$ are outputted from the estimation parameter data base 7.

Figure 10:
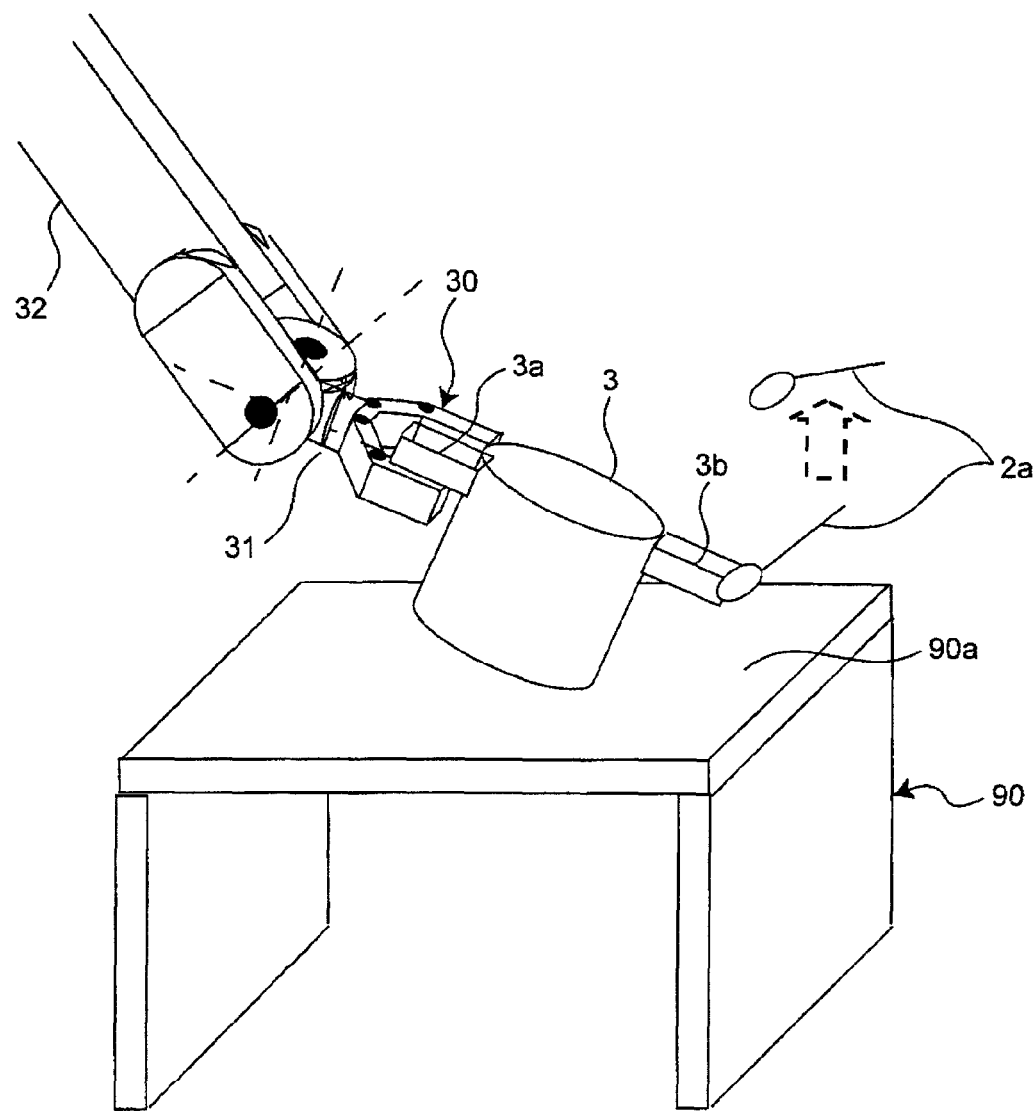
FIG. 10 is an explanatory view that shows a state upon placing the object by the robot arm in cooperation with a person in accordance with the embodiment of the present invention.

The following description will discuss the transported object placed-state determination unit 19 in detail. In the present embodiment, there might be a state in which, in spite of an attempt of the person 2 to place a transported object 3 on an upper face (that is, an object placing face 90a) of the base 90, as shown in FIG. 10, the object is placed in a tilted manner due to an imbalanced state between the robot arm 5 and the hand 30, caused by noise or an offset deviation of the force sensor serving as one example of the force detection unit 13. More specifically, for example, with one handle 3a of the object 3 being held by the hand 30 of the robot arm 5, the arm 2a of the person 2 holding the other handle 3b of the object 3 is lowered, with the result that such a problem occurs in which the object 3 is kept in a tilted state toward the person 2 side.

Therefore, the transported object placed-state determination unit 19 is used for determining whether or not the transported object 3 has been placed on the object placing face 90a. Referring to graphs of FIGS. 11(a) to 11(c), the following description will discuss one example of the transported object plated-state determining method in the transported object placed-state determination unit 19.

First, immediately before the attempt of the person 2 to put the transported object 3 onto the object placing face 90a of the base 90, in general, the object 3 to be transported is shifted from above to below, and stopped to stand still at a certain position. This operation can be determined by the transported object placed-state determination unit 19 by detecting a variation in a z-position (z-component of the hand position and orientation vectors r) of the hand position of the robot arm 5. More specifically, in FIG. 11, as indicated by a graph (a) showing the relationship between the hand z position and time t, when consideration is given to the hand z position (the hand position in the z-direction) of the robot arm 5, the z-position in a period prior to a certain point of time $t_1$, that is, a moment at which the object 3 is placed, is continuously lowered, and the z-position in the period after the certain point of time $t_1$, that is, the moment at which the object 3 is placed, is kept constant without being raised or lowered.

Therefore, when the transported object placed-state determination unit 19 detects the fact that, after the hand z position, which is inputted from the forward kinematical calculation unit 21, has been continuously lowered, the z-position in the period after the certain time $t_1$ is neither lowered, nor raised, and kept constant, the transported object placed-state determination unit 19 determines that the transported object has been placed. The determination of the fact that the z-position has become constant is made, for example, when the z-position is located within a constant range Δz for a fixed period of time as shown in FIG. 11(a). The fixed range Δz is preliminarily set to, for example, 10 mm or the like, based upon experiments or the like preliminarily carried out. In addition to this, a time-differential value of z may be calculated, and for example, when the absolute value of the time-differential value of z is a threshold value or less, that is, when the velocity of z is a threshold value or less, the z position may be defined as constant.

Moreover, immediately before the attempt of the person 2 to put the transported object 3 onto the object placing face 90a of the base 90, as shown in FIG. 10, with one handle 3a of the object 3 being grabbed by the hand 30 of the robot arm 5, the arm 2a of the person 2 holding the other handle 3b of the object 3 is lowered, as shown in FIG. 10. Consequently, when the object 3 is tilted toward the person 2 side by the fact that the arm 2a of the person holding the other handle 3b of the object 3 has been lowered, the angle $\omega_p$, made by the hand of the robot arm 5 relative to the horizontal face, is made downward from the horizontal face, and by detecting this state, it becomes possible to determine that the person 2 has started putting the transported object 3 onto the object placing face 90a of the base 90. More specifically, as indicated by a graph (b) showing the relationship between the angle $\omega_p$ and time t in FIG. 11, the angle $\omega_p$ is kept constant as a negative value during the period after the point of time $t_1$.

Therefore, when the angle $\omega_p$ is calculated from the position and orientation vectors r in the transported object placed-state determination unit 19 so that the transported object placed-state determination unit 19 has detected that the angle $\omega_p$ is kept constant at a negative value during the period after the point of time $t_1$, the transported object placed-state determination unit 19 determines that the transported object is tilted toward the person 2 side so that it is possible to determine that the person 2 has started putting the transported object 3 onto the object placing face 90a of the base 90.

The "constant state" mentioned here can be determined by using the same method as that for determining the z-position as described earlier. Moreover, the force $F_z$ in the vertical direction to be inputted to the transported object plated-state determination unit 19 from the force detection unit 13, generated between the robot arm 5 and the object 3, has a downward value when the person 2 is moving the arm 2a holding the handle 3b of the object 3 downward from the horizontal face, and when the person 2 places the object 3 onto the placing face 90a, the absolute value of the force $F_z$ in the vertical direction becomes smaller to come closer to 0. After the placing process, the force $F_z$ in the vertical direction is kept constant at a negative value. By detecting this state, it is possible to determine that the person 2 has tried to put the object 3 on the object placing face 90a, and has then put it thereon. More specifically, as indicated by a graph (c) showing the relationship between the force $F_z$ in the vertical direction and time t in FIG. 11, the force $F_z$ in the vertical direction prior to the period before the point of time $t_1$ corresponding to the moment at which the object 3 is placed has a downward value, and during the period before the point of time $t_1$ corresponding to the moment at which the object 3 is placed, the force $F_z$ in the vertical direction is raised, and thereafter, during the period after the point of time $t_1$ corresponding to the moment at which the object 3 is placed, the force $F_z$ in the vertical direction is kept constant at a negative value.

The transported object placed-state determination unit 19 is designed to determine that the transported object 3 has been placed, when the transported object placed-state determination unit 19 has detected the facts that the force $F_z$ in the vertical direction inputted from the force detection unit 13 has a downward value, that during the period before the certain point of time $t_1$, the force $F_z$ in the vertical direction is lowered, and that during the period after the certain point of time $t_1$, the force $F_z$ in the vertical direction is kept constant at a negative value. With respect to the determination by the transported object placed-state determination unit 19 of the fact that the force $F_z$ in the vertical direction is lowered, the transported object placed-state determination unit 19 determines that it is lowered when the time-differential value of the force $F_z$ in the vertical direction reaches a certain threshold value or more. The threshold value is preliminarily set, for example, to 5N/s or the like, by experiments and the like preliminarily carried out. Moreover, the determination of the constant state can be made by using the same method as that for determining the position in the z-direction.

Figure 11:
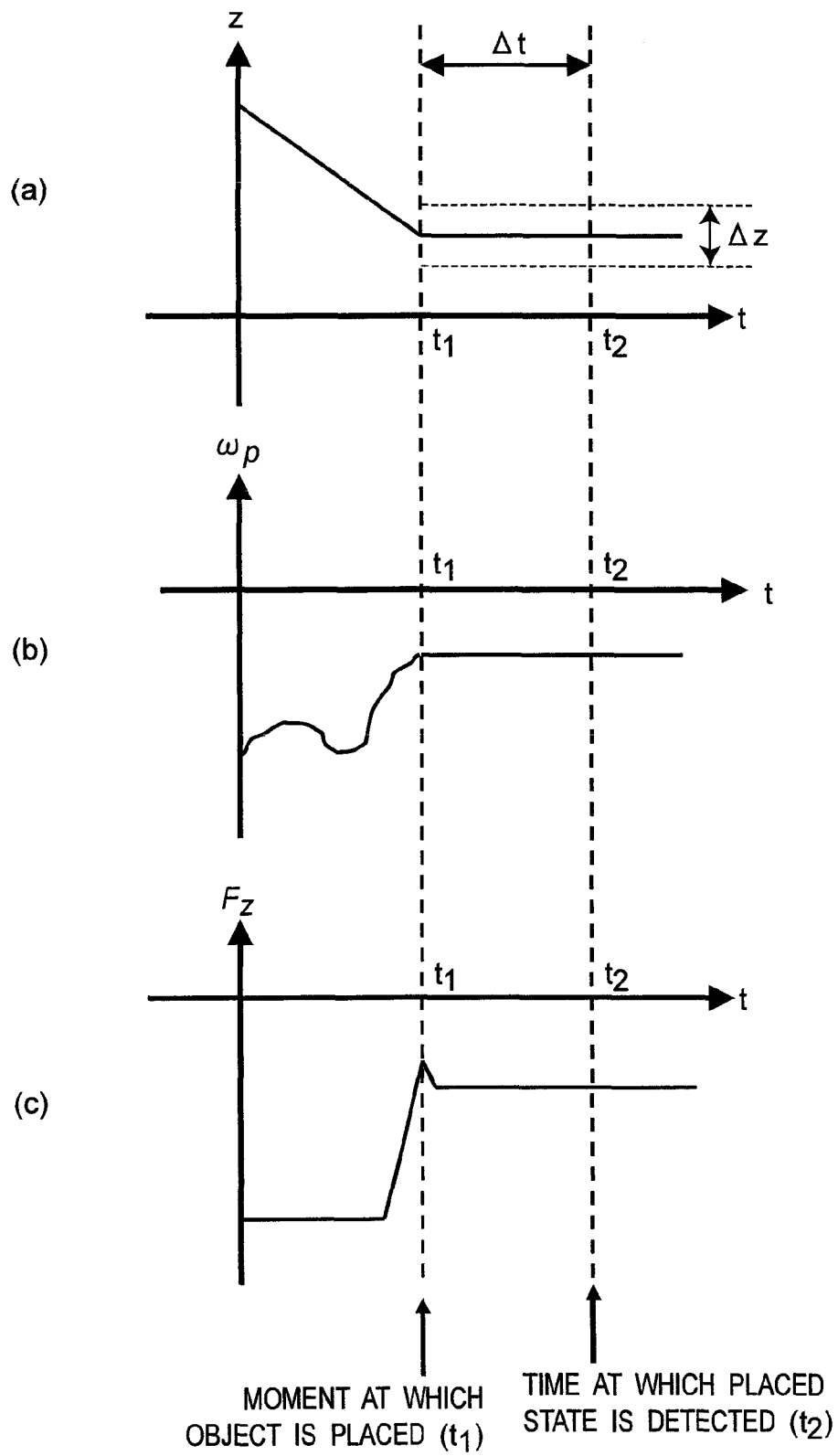
FIG. 11 is a view that explains one example of a determining method of the placed state of a transported object to be carried out by a transported object placed-state determining unit in the robot-controlling device in accordance with the embodiment of the present invention (FIG. 11($a$) is a graph that shows a relationship between a hand position z of the robot arm and time t, FIG. 11($b$) is a graph that shows a relationship between an angle $\omega_p$ of the robot arm and time t, and FIG. 11($c$) is a graph that shows a relationship between a force $F_z$ in the vertical direction of the robot arm and time t)

As described above, in a case where, based upon information of the hand z position of the robot arm 5, information of the angle $\omega_p$ made by the hand of the robot arm 5 relative to the horizontal face and the force information $F_z$ of the outputs of the force detection unit 13, the transported object placed-state determination unit 19 determines that the hand 30 of the hand of the robot arm 5 is tilted downward from the horizontal face in accordance with the output of the encoder 11 serving as one example of the angle detection unit, and determines that a variation in the hand z position is turned from a lowering state to a constant state in accordance with the output of the forward kinematical calculation unit 21 serving as one example of the hand position detection unit, and then determines that the downward vertical force is turned to be decreased in accordance with the output of the force detection unit 13, the transported object placed-state determination unit 19 regards "the object 3 as being placed onto the placing face 90a" at a point of time $t_2$ after a lapse of predetermined time Δt from the point of time $t_1$ corresponding to the moment at which the object 3 is placed (in FIG. 11). The predetermined time Δt is preliminarily set to, for example, 1 second or the like, based upon experiments and the like preliminarily carried out.

Next, the following description will discuss a state in which the transported object placed-state determination unit 19 regards "the object 3 as being released from the placed state on the object placing face 90a". In general, since it is assumed that the place on which the object 3 is placed is a horizontal face, the angle of the hand of the robot arm 5 is considered to be set from the downward direction relative to the horizontal direction to the horizontal direction. For this reason, during a period in which the transported object placed-state determination unit 19 determines that "the object 3 is being placed onto the object placing face 90a", a signal indicating the transported-object placing state is continuously outputted therefrom, and the hand angle of the robot arm 5 is continuously acquired from the encoder 11, and at the time when the hand angle of the robot arm 5 has become upward from the horizontal face, the transported object placed-state determination unit 19 regards "the object 3 as being released from the placed state" so that the transported object placed-state determination unit 19 stops the output of the signal indicating the transported object placing state. Moreover, since the force $F_z$ in the vertical direction exerted between the robot arm 5 and the object 3 is in general kept from the downward force to 0, even when the object 3 is placed on the placing face 90a. Therefore, the force $F_z$ in the vertical direction outside this range is detected by the force detection unit 13 (that is, the force detection unit 13 is allowed to detect the $F_z$ in the vertical direction being turned into an upward force), and in a case where the corresponding detection information is inputted to the transported object placed-state determination unit 19, since the transported object placed-state determination unit 19 regards "the hand 30 of the robot arm 5 as pressing the object 3 onto the placing face 90a" or "the person 2 as raising the object 3 upward", the transported object placed-state determination unit 19 regards "the object 3 as being released from the placed state" in this case also.

Figure 8:
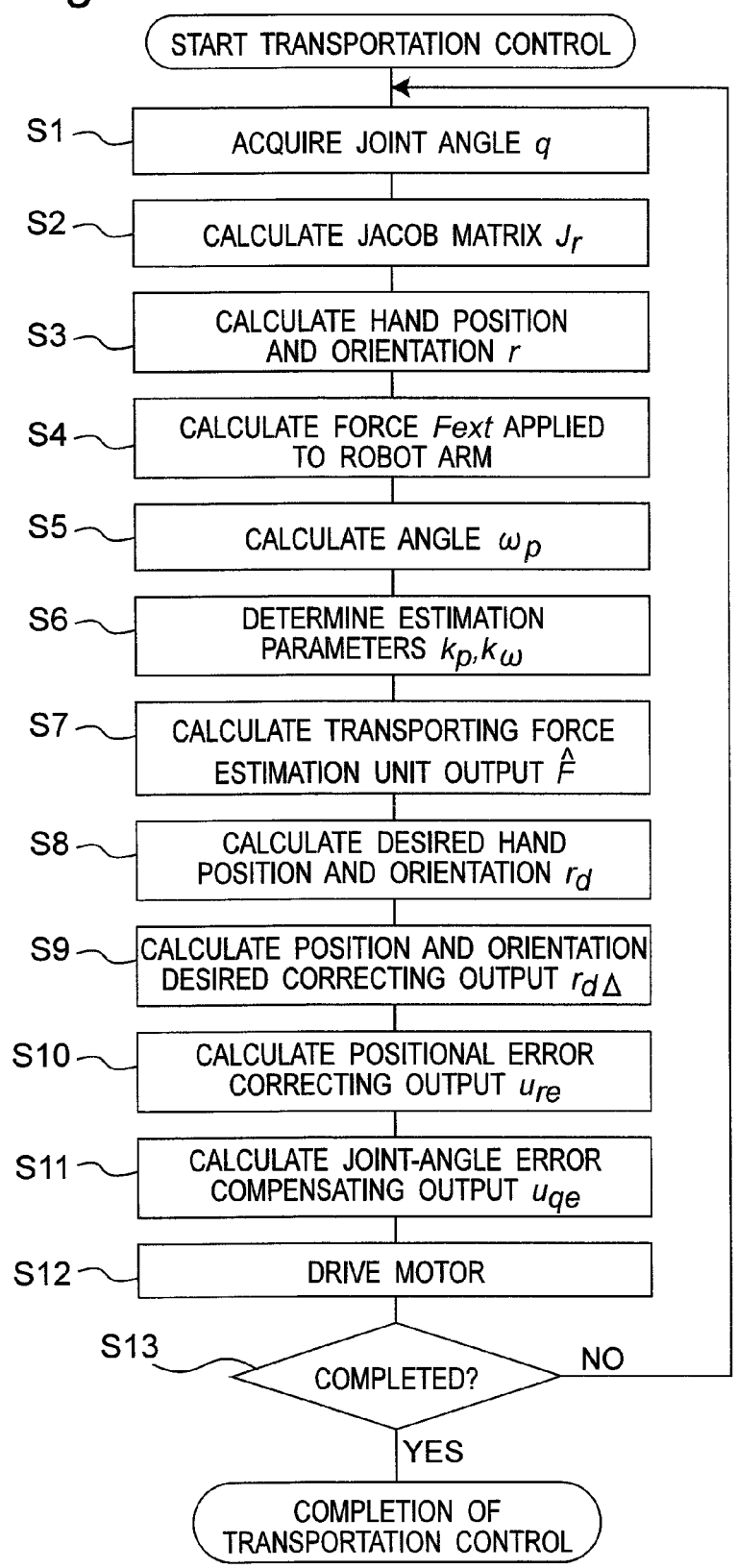
FIG. 8 is a flow chart that shows operation steps used for carrying out object transporting operation controls in a movement control unit of the robot-controlling device in accordance with the embodiment of the present invention.
Figure 9:
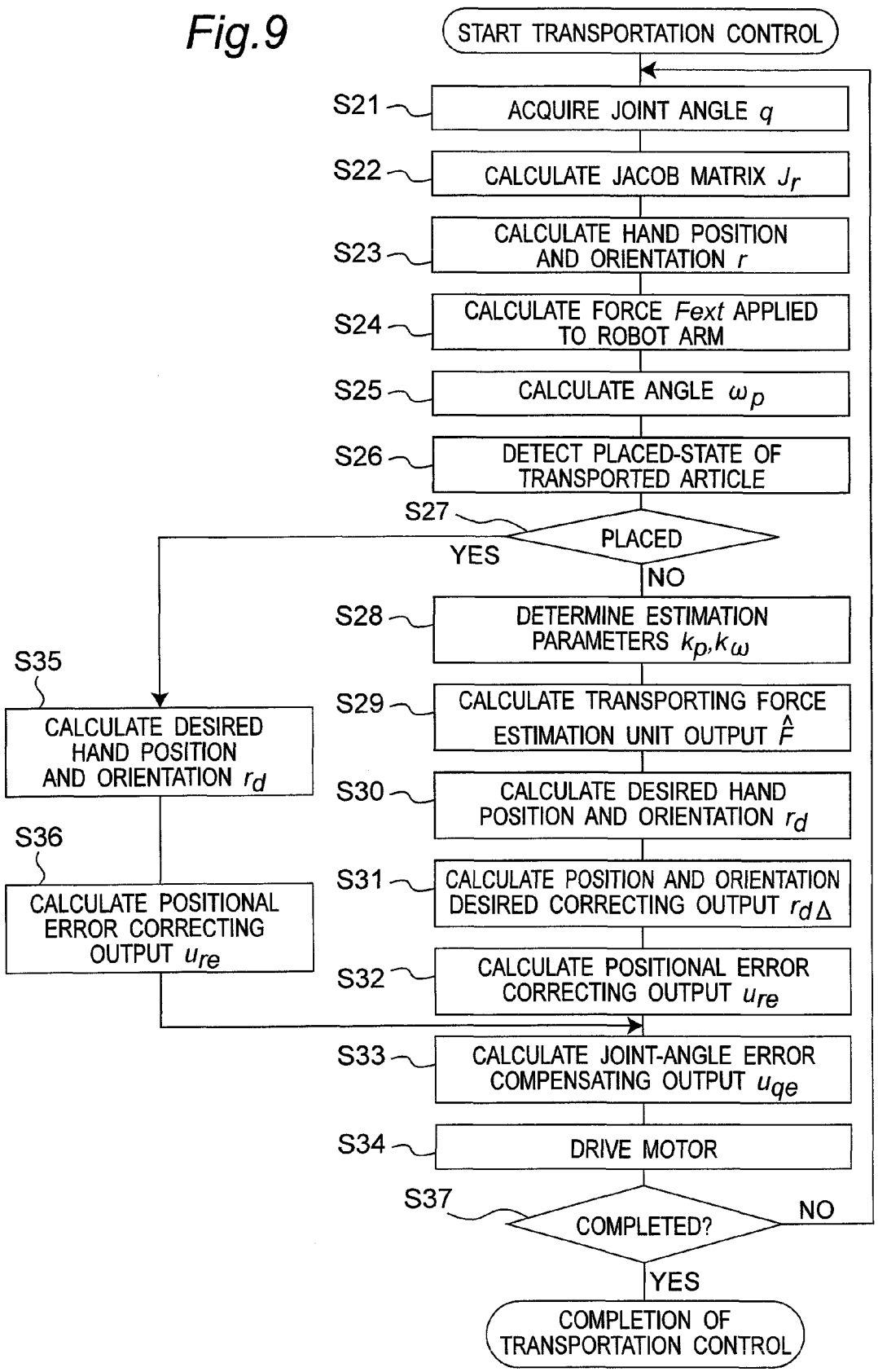
FIG. 9 is a flow chart that shows operation steps used for determining a placed state of a transported object in the movement control unit of the robot-controlling device in accordance with the embodiment of the present invention.

Referring to flow charts of FIGS. 8 and 9, the following description will discuss operation steps of the transportation controlling unit 8. These functions of the operation steps can be respectively executed by a computer, as controlling program 6 (see FIG. 2).

First, referring to the flow chart of FIG. 8, the following description will discuss a state in which no operations are carried out by the transported object placed-state determination unit 19.

Joint-angle data (joint variable vectors or joint angle vectors q) measured by the respective encoders 11 of the joint portions of the robot arm 5 are acquired by the controlling device 4 from the encoders 11 (step S1).

Next, based upon the joint-angle data (joint variable vectors or joint angle vectors q) acquired by the controlling device 4, the approximation reverse kinematical calculation unit 22 executes calculations of a Jacob matrix $J_r$ and the like required for kinematical calculations of the robot arm 5 (step S2).

Next, based upon the joint-angle data (joint variable vectors or joint angle vectors q) from the respective encoders 11 of the robot arm 5, the forward kinematical calculation unit 21 calculates the current hand position and orientation vectors r of the robot arm 5, and outputs the resulting data to the estimation parameter data base 7, the positional error calculation unit 40, the desired trajectory generating unit 18 and the like (step S3).

Next, based upon the output from the force sensor attached to the robot arm 5, the force detection unit 13 calculates a force $F_{ext}$ that is exerted on the hand, and outputs the resulting data to the estimation parameter data base 7, the transporting force estimation unit 14, the desired trajectory generating unit 18 and the like (step S4).

Next, the transporting force estimation unit 14 determines an angle $\omega_p$ from the hand position and orientation vectors r calculated and found by the forward kinematical calculation unit 21 in step S3. In a case where the hand orientation is defined as shown in FIGS. 4B to 4D, the angle $\omega_p=0$ holds. Moreover, the transporting force estimation unit 14 outputs the angle $\omega_p$ to the estimation parameter data base 7 (step S5).

Based upon the force $F_{ext}$ corresponding to the output of the force detection unit 13 and the angle $\omega_p$, values of parameters $k_p$ and $k_\omega$ are determined by the estimation parameter data base 7, and respectively outputted to the transporting force estimation unit 14 from the estimation parameter data base (step S6).

Next, based upon the parameters $k_p$ and $k_\omega$, the force $F_{ext}$ being exerted on the hand, the angle $\omega_p$ and joint-angle data (joint variable vectors or joint angle vectors q), the transporting force estimation unit 14 calculates a transporting force $F_{carry}$, and outputs the corresponding value to the impedance controlling unit 17 (step S7).

Based upon a trajectory operating program in the operation trajectory program-use data base 37 for the robot arm 5 preliminarily stored therein and the hand position and orientation vectors r found by the calculations in the forward kinematical calculation unit 21 in step S3, the desired trajectory generating unit 18 calculates the hand position and orientation desired vectors $r_d$ of the robot arm 5 (step S8).

Next, based upon the inertia M, viscosity D and rigidity K of the mechanical impedance parameters preliminarily set by experiments and an equivalent hand external force $F_{carry}$ to be applied to the robot arm 5 calculated by the transporting force estimation unit 14, the impedance controlling unit 17 calculates hand position and orientation desired correcting outputs $r_{d\Delta}$, and outputs the resulting values to the positional error calculation unit 40 (step S9).

Next, the positional error calculation unit 40 calculates hand position and orientation correcting desired vectors $r_{dm}$ corresponding to a sum $(r_d+r_{d\Delta})$ of the hand position and orientation desired vectors $r_d$ from the desired trajectory generating unit 18 and hand position and orientation desired correcting outputs $r_{d\Delta}$ from the impedance controlling unit 17. Next, the positional error calculation unit 40 calculates hand position and orientation error $r_e$ corresponding to a difference $(r_{dm}-r)$ between the hand position and orientation correcting desired vectors $r_{dm}$ and the current hand position and orientation vectors r from the forward kinematical calculation unit 21, and outputs the resulting values to the positional error compensating unit 20. Lastly, the positional error compensating unit 20 calculates a positional error compensating output $u_{re}$ that forms a controlling input for controlling the robot arm 5 so as to allow the hand position and orientation error $r_e$ to be converged to 0, and outputs the resulting value from the positional error compensating unit 20 to the approximation reverse kinematical calculation unit 22 (step S10). A PID compensator is proposed as a specific example of the positional error compensating unit 20. By appropriately adjusting three gains, that is, proportional gain, differential gain and integral gain, corresponding to an orthogonal matrix of a constant, the controlling process of the positional error compensating unit 20 is exerted so as to converge the positional error to 0.

Next, by multiplying the positional error compensating output $u_{re}$ by a reverse matrix of the Jacob matrix $J_r$ calculated in step S2, the approximation reverse kinematical calculation unit 22 converts the positional error compensating output $u_{re}$ from the value relating to the error of the hand position and orientation to a joint angle error compensating output $u_{qe}$ that is a value relating to the error of the joint angle, and outputs the resulting value to the motor driver 10 of the robot 5A (step S11).

Next, the joint angle error compensating output $u_{qe}$ is given to the motor driver 10 through the input/output IF 9 as information from the approximation reverse kinematical calculation unit 22, and based upon the joint angle error compensating output $u_{qe}$, the motor driver 10 changes the amount of electric current flowing through each of the motors 12 of the joint portions. By this change in the amount of electric current, a rotating movement is generated in each of the joint portions in the robot arm 5 so that the robot arm 5 carries out operations (step S12).

In the case of continuing steps S1 to S12 of the transport controlling operations, the sequence returns to step S1, while in the other cases (in the case of neither turning off the power supply nor stopping the robot, but completing only the transport controlling operations), the steps S1 to S12 of the transport controlling operations are completed (step S13).

By executing the above-mentioned steps S1 to S12 repeatedly as the controlling calculation loop, the control of the operations of the robot arm 5 can be achieved, that is, the transporting operations of an object 3 in cooperation with the person 2 and the robot arm 5 can be achieved.

Referring to a flow chart of FIG. 9, the following description will discuss the placed-state determining operation of a transported object carried out by the transported object placed-state determination unit 19.

Joint-angle data (joint variable vectors or joint angle vectors q) measured by the respective encoders 11 of the joint portions of the robot arm 5 are acquired by the controlling device 4 from the encoders 11 (step S21).

Next, based upon the joint-angle data (joint variable vectors or joint angle vectors q) acquired by the controlling device 4, the approximation reverse kinematical calculation unit 22 executes calculations of a Jacob matrix $J_r$ and the like required for kinematical calculations of the robot arm 5 (step S22).

Next, based upon the joint-angle data (joint variable vectors or joint angle vectors q) from the respective encoders 11 of the robot arm 5, the forward kinematical calculation unit 21 calculates the current hand position and orientation vectors r of the robot arm 5, and outputs the resulting data to the estimation parameter data base 7, the positional error compensating unit 20, the desired trajectory generating unit 18 and the transported object placed-state determination unit 19 (step S23).

Next, based upon the output from the force sensor attached to the robot arm 5, the force detection unit 13 calculates a force $F_{ext}$ that is exerted on the hand, and outputs the resulting data to the estimation parameter data base 7, the transporting force estimation unit 14, the desired trajectory generating unit 18 and the transported object placed-state determination unit 19 (step S24).

Next, the transporting force estimation unit 14 and the transported object placed-state determination unit 19 determine an angle $\omega_p$ from the hand position and orientation vectors r calculated and found by the forward kinematical calculation unit 21 in step S3. In the case where the hand orientation is defined as shown in FIGS. 4B to 4D, the angle $\omega_p=\theta$ holds. Moreover, the transporting force estimation unit 14 outputs the angle $\omega_p$ to the estimation parameter data base 7 (step S25).

Next, force information $F_z$ in the vertical direction of the outputs of the force detection unit 13 is inputted to the transported object placed-state determination unit 19 (step S26). Moreover, the transported object placed-state determination unit 19 further determines the hand z position (z-component of the hand position and orientation vectors r) from the hand position and orientation vectors r calculated and found by the forward kinematical calculation unit 21 in step S3.

Next, based upon the inputted information, the transported object placed-state determination unit 19 detects whether or not the object 3 thus transported has been placed on the object placing face 90a of a base 90 such as a desk, and makes the determination (step S27). More specifically, as explained earlier, the transported object placed-state determination unit 19 determines whether or not "the object 3 has been placed on the placing face 90a" from the information of the hand z position of the robot arm 5 and the information of the angle $\omega_p$ made by the hand of the robot arm 5 relative to the horizontal face from the forward kinematical calculation unit 21, and the force information $F_z$ in the vertical direction of the outputs of the force detection unit 13.

Therefore, for example, in a case where, based upon the angle $\omega_p$ made by the hand of the robot arm 5 relative to the horizontal face, calculated from the hand position and orientation vectors r calculated and found by the forward kinematical calculation unit 21, the transported object placed-state determination unit 19 determines that the hand 30 of the end of the robot arm 5 is tilted downward from the horizontal face, that the variation in the hand z position has been turned from a lowering state to a constant state in accordance with the output of the forward kinematical calculation unit 21, and that the downward force in the vertical direction is turned into a decrease based upon the output of the force detection unit 13 (at a point of time $t_2$ after a lapse of predetermined time $\Delta t$ from the point of time $t_1$ corresponding to the moment at which the object 3 is placed in FIG. 11), the transported object placed-state determination unit 19 regards "the object 3 as being placed onto the placing face 90a". In this case, the predetermined time $\Delta t$ is preliminarily set to, for example, 1 second or the like, based upon experiments and the like preliminarily carried out.

In contrast, in the other cases, the transported object placed-state determination unit 19 determines that "the object 3 is not placed on the placing face 90a".

The following description will discuss a force controlling process that is carried out in step S27 in a case where the transported object placed-state determination unit 19 determines that "the object 3 is not placed on the placing face 90a".

Based upon the force $F_{ext}$ that is an output of the force detection unit 13 and the angle $\omega_p$ inputted from the transporting force estimation unit 14, the estimation parameter data base 7 respectively determines values of parameters $k_p$ and $k_\omega$, and the resulting parameters are outputted from the estimation parameter data base 7 to the transporting force estimation unit 14 (step S28).

Next, based upon the parameters $k_p$ and $k_\omega$, the force $F_{ext}$ being exerted on the hand, the angle $\omega_p$ and joint-angle data (joint variable vectors or joint angle vectors q), the transporting force estimation unit 14 calculates a transporting force $F_{carry}$, and outputs the corresponding value to the impedance controlling unit 17 (step S29).

Based upon the trajectory operation program in the operation trajectory program-use data base 37 for the robot arm 5 preliminarily stored therein and the hand position and orientation vectors r found by the calculations in the forward kinematical calculation unit 21 in step S23 and the force information from the force detection unit 13, the desired trajectory generating unit calculates the hand position and orientation desired vectors $r_d$ of the robot arm 5, and outputs the corresponding data to the positional error calculation unit (step S30).

Next, based upon the inertia M, viscosity D and rigidity K of the mechanical impedance parameter preliminarily set by experiments and an equivalent hand external force $F_{carry}$ applied to the robot arm 5 calculated by the transporting force estimation unit 14, the impedance controlling unit 17 calculates hand position and orientation desired correcting outputs $r_{d\Delta}$, and outputs the resulting values to the positional error calculation unit (step S31).

Next, the positional error calculation unit 40 calculates hand position and orientation correcting desired vectors $r_{dm}$ corresponding to a sum $(r_d+r_{d\Delta})$ of the hand position and orientation desired vectors $r_d$ from the desired trajectory generating unit 18 and hand position and orientation desired correcting outputs $r_{d\Delta}$ from the impedance controlling unit 17. Next, the positional error calculation unit 40 calculates hand position and orientation error $r_e$ corresponding to a difference $(r_{dm}-r)$ between the hand position and orientation correcting desired vectors $r_{dm}$ and the current hand position and orientation vectors r from the forward kinematical calculation unit 21, and outputs the resulting values to the positional error compensating unit 20. Lastly, the positional error compensating unit 20 calculates a positional error compensating output $u_{re}$ that forms a controlling input for controlling the robot arm 5 so as to allow the hand position and orientation error $r_e$ to be converged to 0, and outputs the resulting value from the positional error compensating unit 20 to the approximation reverse kinematical calculation unit 22 (step S32). A PID compensator is proposed as a specific example of the positional error compensating unit 20. By appropriately adjusting three gains, that is, proportional gain, differential gain and integral gain, corresponding to an orthogonal matrix of a constant, the controlling process of the positional error compensating unit 20 is exerted so as to converge the positional error to 0.

Next, by multiplying the positional error compensating output $u_{re}$ by a reverse matrix of the Jacob matrix $J_r$ calculated in step S22, the approximation reverse kinematical calculation unit 22 converts the positional error compensating output $u_{re}$ from the value relating to the error of the hand position and orientation to a joint angle error compensating output $u_{qe}$ that is a value relating to the error of the joint angle, and outputs the resulting value to the motor driver 10 of the robot 5A (step S33).

Next, the joint angle error compensating output $u_{qe}$ is given to the motor driver 10 through the input/output IF 9 as information from the approximation reverse kinematical calculation unit 22, and based upon the joint angle error compensating output $u_{qe}$, the motor driver 10 changes the amount of current flowing through each of the motors 12 of the joint portions. By this change in the amount of electric current, a rotating movement is generated in each of the joint portions in the robot arm 5 so that the robot arm 5 carries out operations (step S34).

In the case of continuing steps S21 to S36 of the transport controlling operations, the sequence returns to step S21, while in the other cases (in the case of not turning off the power supply or stopping the robot, but completing only the transport controlling operations), the steps S21 to S36 of the transport controlling operations are completed (step S37).

Referring to FIG. 9, the following description will discuss a position controlling operation to be carried out in a case where the transported object placed-state determination unit 19 determines in step S27 that "the object 3 is placed on the placing face 90*a* ".

The operation trajectory program-use data base 37 preliminarily stores a trajectory through which the robot arm 5 is operated upon determination that "the object 3 has been placed on the placing face 90*a*". In this case, as a trajectory used for correcting the tilt of the object 3, for example, the trajectory is proposed in which the object 3 is moved downward in the vertical direction at a speed of 10 mm per second. In the case when the transported object placed-state determination unit 19 determines that "the object 3 has been placed on the placing face 90*a*", the operation trajectory program of the operation trajectory program-use data base 37 for use in the placed state, preliminarily stored, is inputted to the desired trajectory generating unit 18.

In a case where the force Fz in the vertical direction of forces exerted on the hand of the robot arm 5 corresponds to a downward force, based upon the operation trajectory program of the operation trajectory program-use data base 37 of the robot arm 5 and the hand position and orientation vectors r calculated and found by the forward kinematical calculation unit 21 in step S23, the desired trajectory generating unit 18 calculates the hand position and orientation desired vectors $r_d$ of the robot arm 5, and outputs the corresponding values to the positional error calculation unit 40. Moreover, in a case where, among forces exerted on the hand of the robot arm 5, the force Fz in the vertical direction becomes 0, or is turned into an upward force, the desired trajectory generating unit 18 continues to output the same value to the positional error calculation unit 40 without updating the hand position and orientation desired vectors rd of the robot arm 5 (step S35). Thus, the robot arm 5 is continuously lowered until the object 3 has been placed on the placing face 90*a* without any tilt, and stopped at a position where the object 3 has been placed on the placing face 90*a* without any tilt to no longer give the downward force to the robot.

Next, the positional error calculation unit 40 calculates hand position and orientation correcting desired vectors $r_{dm}$ corresponding to a sum $(r_d+r_{d\Delta})$ of the hand position and orientation desired vectors $r_d$ from the desired trajectory generating unit 18 and hand position and orientation desired correcting outputs $r_{d\Delta}$ from the impedance controlling unit 17, and since the hand position and orientation desired correcting outputs $r_{d\Delta}$ from the impedance controlling unit 17 is 0, $r_d=r_{dm}$ holds. Next, the positional error calculation unit 40 calculates hand position and orientation error $r_e$ corresponding to a difference $(r_{dm}-r)$ between the hand position and orientation correcting desired vectors $r_{dm}$ and the current hand position and orientation vectors r from the forward kinematical calculation unit 21, and outputs the resulting values to the positional error compensating unit 20. Lastly, the positional error compensating unit 20 calculates a positional error compensating output $u_{re}$ that forms a controlling input for controlling the robot arm 5 so as to allow the hand position and orientation error $r_e$ to be converged to 0, and outputs the resulting value from the positional error compensating unit 20 to the approximation reverse kinematical calculation unit 22 (step S36). A PID compensator is proposed as a specific example of the positional error compensating unit 20. By appropriately adjusting three gains, that is, proportional gain, differential gain and integral gain, corresponding to an orthogonal matrix of a constant, the controlling process of the positional error compensating unit 20 is exerted so as to converge the positional error to 0.

Next, the aforementioned step S34 is carried out.

By executing the above-mentioned steps S21 to S36 repeatedly as the controlling calculation loop, the control of the transporting operations and placing operations of a transported object of the robot arm 5 can be achieved, that is, the operations of the robot arm 5 by which an object 3 is transported in cooperation with the person 2 and the robot arm 5 and upon placing the object 3, the object 3 can be placed without causing any tilt relative to the horizontal face can be achieved.

In the above-mentioned embodiments, after the determination of the placed-state of the object 3 by the transported object placed-state determination unit 19, based upon the result of the placed-state determination in the transported object placed state determination unit 19, the force control and the positional control of the robot arm 5 are automatically switched so as to carry out the transported object placing operation, and for the purpose of safety, for example, a button or the like may be installed so that, only when the transported object placed-state determination unit 19 has determined the placed-state of the object 3 and the person 2 pushes the button, the force control and the positional control of the robot arm 5 may be switched. With this arrangement, only when the person 2 intends to do so, the force control and the positional control of the robot arm 5 can be switched, while, in a case where the person 2 does not intend to do so, the force control and the positional control of the robot arm 5 are not switched; thus, it becomes possible to further enhance the safety.

Additionally, in the above-mentioned embodiments, the force control is carried out for all the directions of the six axes; however, with respect to movements except for the movements in the vertical directions and the amount of pitch, the moving operation can be carried out not by the force control, but by the positional control.

As described above, in accordance with the controlling device 4 of the embodiments of the present invention, it is possible to provide a controlling device which can transport the object 3 smoothly without pressing the object 3 onto an interfered object 43, and achieve safe robot controlling operations, even in a case where, upon transporting an object 3 in cooperation with the person 2 and the robot arm 5, the weight of the object 3 is unknown or when the weight of the object 3 is changed on the way.

Figure 12:
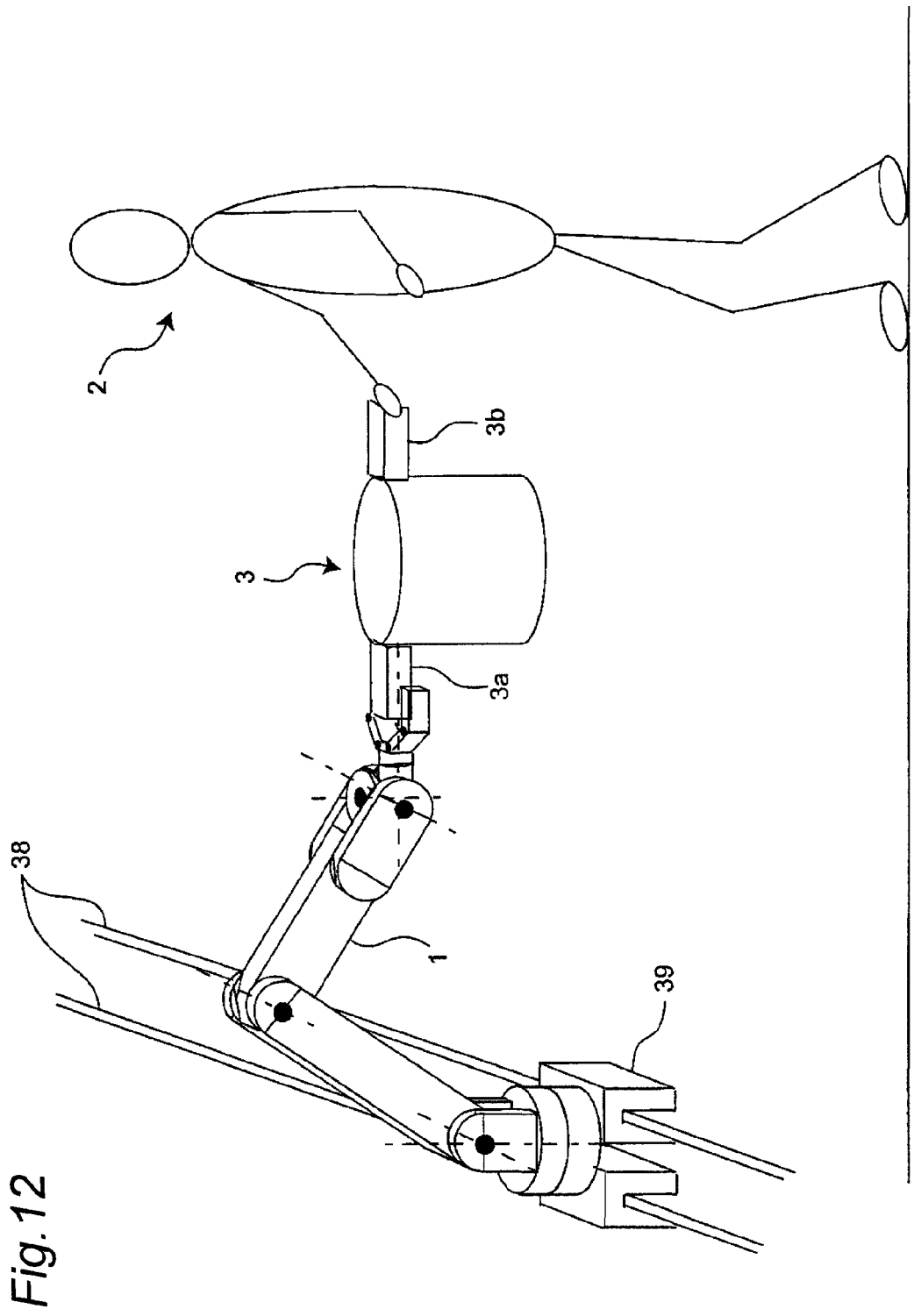
FIG. 12 is an explanatory view that shows a robot system in accordance with a modified example of the embodiment of the present invention.
Figure 13A:
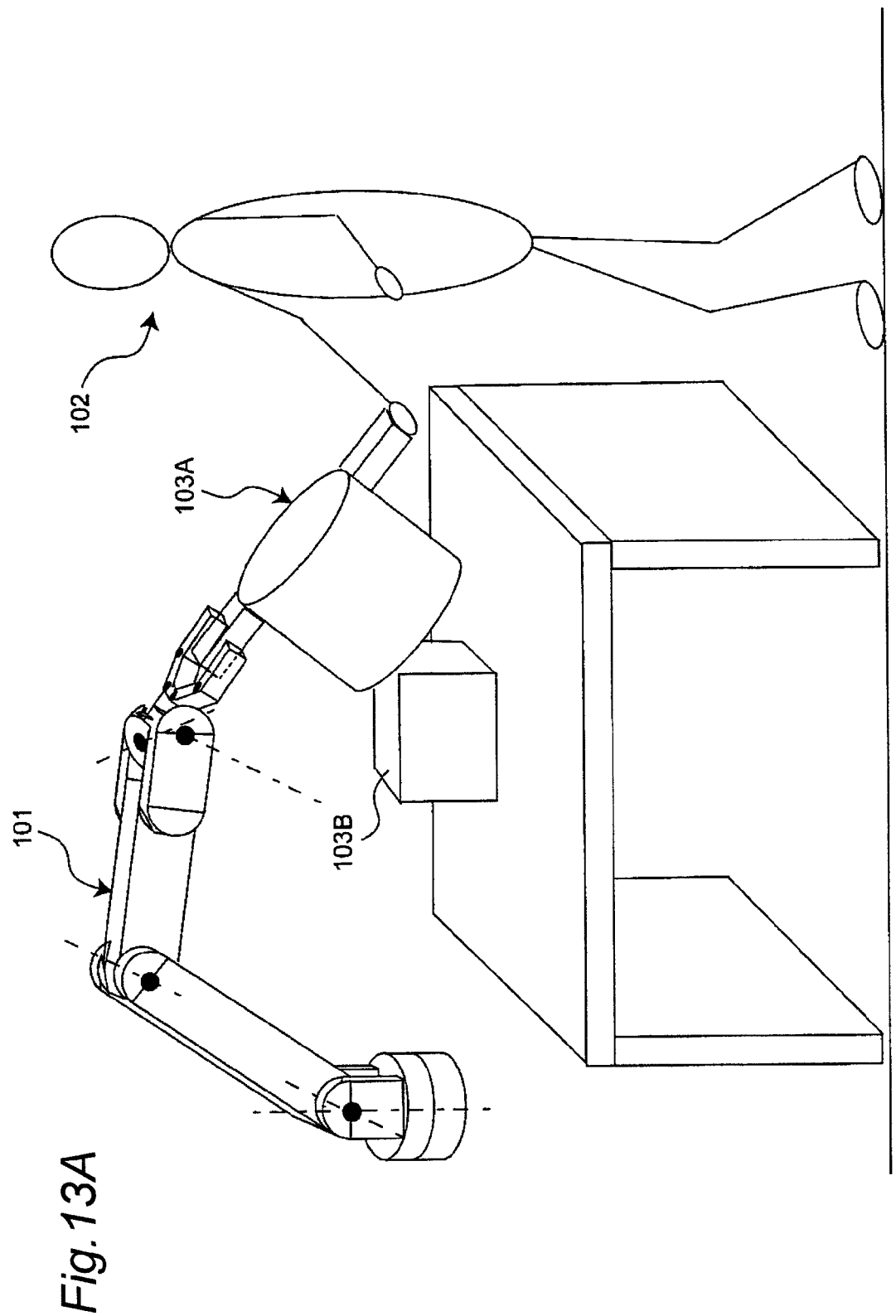
FIG. 13A is a view that shows the outline of a robot-controlling device in accordance with the related art.
Figure 13B:
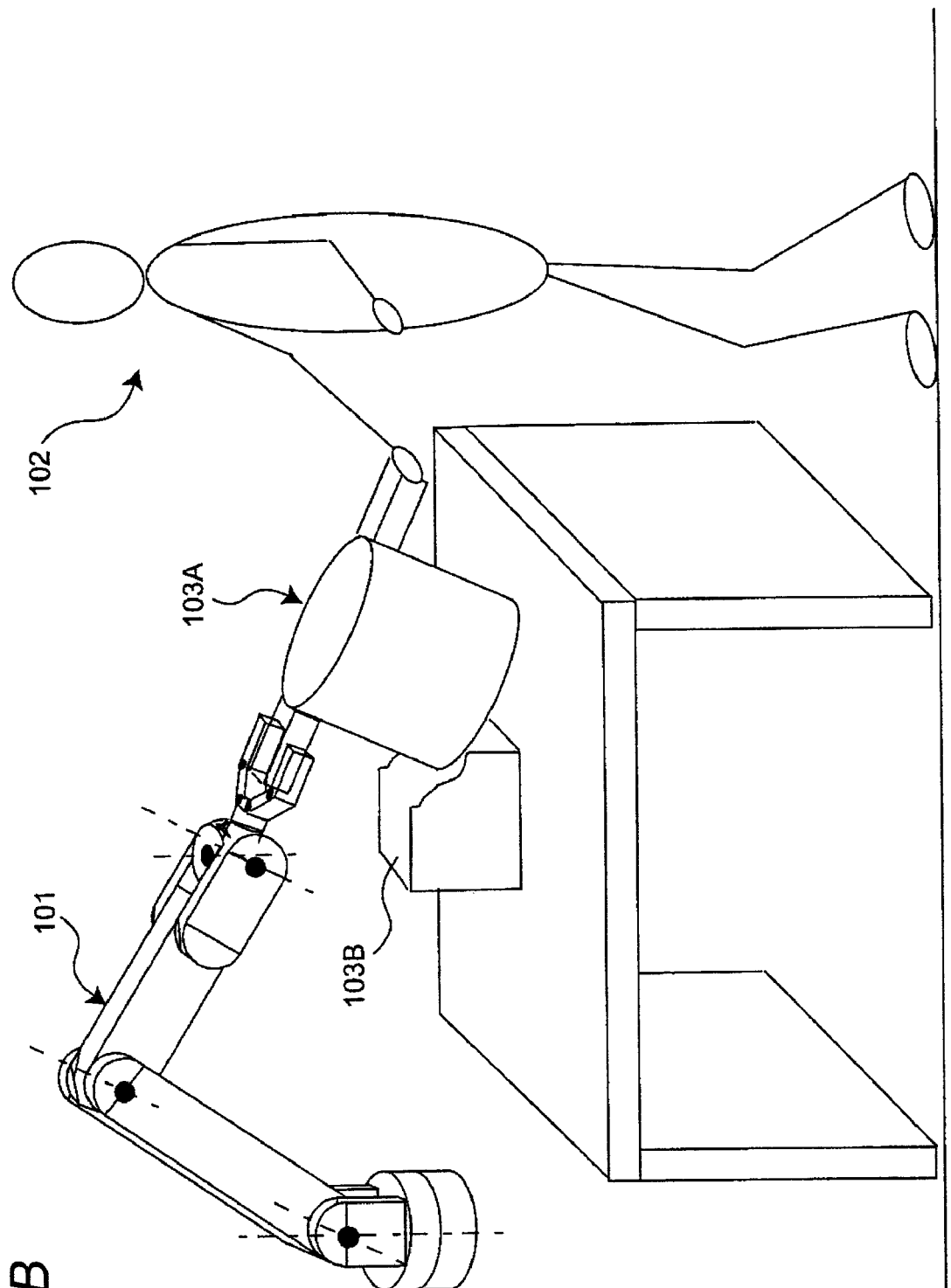
FIG. 13B is a view that explains problems with the robot-controlling device of the related art.

Moreover, not limited to the structure in which the base end of the robot arm 5 is secured onto a wall face 9 as shown in FIG. 12, another structure may be used in which the base end of the robot arm 5 is supported by a moving member 39 that is a sliding unit capable of moving along a pair of rails 38, with the rails 38 being secured onto the wall face 9, so that the robot arm 5 can be moved along the rails 38 laterally, for example, in the horizontal directions. The moving member 39 may have a built-in motor or the like that can drive itself to move under control of the controlling device 4, or the moving member 39 is allowed to freely move along the rails 38 by the force of the person 2 in the transporting direction together with the person 2.

Additionally, by properly combining the arbitrary embodiments of the aforementioned various embodiments, the effects possessed by the embodiments can be produced.

INDUSTRIAL APPLICABILITY

The present invention is effectively used for a robot such as a house-keeping robot that works in cooperation with a man, a controlling device and a controlling method for a robot (arm) that controls operations of the robot arm of the robot and a controlling program for the robot controlling device. Moreover, not limited to the house-keeping robot, the present invention is also applicable to an industrial robot that works in cooperation with a man, or a controlling device and a controlling method for a robot arm of a movable mechanism in a production facility and the like, as well as to a robot having the controlling device for a robot arm and a controlling program for a robot arm.

Although the present invention has been fully described in connection with the preferred embodiments thereof with reference to the accompanying drawings, it is to be noted that various changes and modifications are apparent to those skilled in the art. Such changes and modifications are to be understood as included within the scope of the present invention as defined by the appended claims unless they depart therefrom.

The invention claimed is:

1. A robot for transporting an object in cooperation with a person, the robot comprising:
a robot arm and a hand arranged at an end of the robot arm, the robot arm and the hand being configured to support one side of the object in the vertical direction while the person holds another side of the object;
a driving unit that adjusts an angle of the hand;
a force detection unit that detects and outputs a force exerted between the object and the hand;
an angle detection unit that detects and outputs the angle of the hand; and
a control unit that carries out a force controlling operation for controlling so as to set a force in a vertical direction of the robot arm to a predetermined force, based upon the output of the angle detection unit and the output of the force detection unit,
wherein the force detection unit detects and outputs a force in the vertical direction exerted between the object and the hand, and the control unit determines an input in the vertical direction of the force control based upon the output of the angle detection unit and the output of the force detection unit so as to carry out the force controlling operation in such a manner that, in a case where the person raises the object to cause the input in the vertical direction of the force controlling operation to become upward, the robot arm is raised, and in a case where the person lowers the object to cause the input in the vertical direction of the force controlling operation to become downward, the robot arm is lowered.

2. The robot of claim 1, further comprising:
a transporting force estimation unit that estimates a force that the person exerts on the robot in the vertical direction as an input in the vertical direction of the force controlling operation, by using a value obtained by the expression $(k_p F_z + k_\omega \omega_p)$ when the value detected by the force detection unit is less than or equal to 0, wherein $k_p$ and $k_\omega$ are coefficients, $F_z$ is the vertical component of the output of the force detection unit, and $\omega_p$ is the output of the angle detection unit,
wherein, when the value detected by the force detection unit is greater than 0, the transporting force estimation unit outputs the value detected by the force detection unit,
wherein based upon the force estimated by the transporting force estimation unit, the force controlling operation is carried out so as to set the force in the vertical direction of the robot arm to a predetermined force.

3. The robot of claim 2, further comprising:
a hand position detection unit that detects a position of the hand of the end of the robot arm; and
a transported object placed-state determining unit that determines whether or not the transported object has been placed on an object placing face based upon output of the hand position detection unit, output of the angle detection unit, and output of the force detection unit, wherein the transport object placed-state determining unit determines that the transported object has been placed on an object placing face when the output of the hand position detection unit and the output of the angle detection unit become constant after the output of the force detection unit becomes close to 0, and wherein, upon determination by the transported object placed-state determining unit that the object has been placed on the object placing face, a controlling operation in the vertical direction of the robot arm is switched from the force-controlling operation to a position-controlling operation.

4. The robot of claim 1, further comprising:

a hand position detection unit that detects a position of the hand of the end of the robot arm; and a transported object placed-state determining unit that determines whether or not the transported object has been placed on an object placing face based upon output of the hand position detection unit, output of the angle detection unit, and output of the force detection unit, wherein the transport object placed-state determining unit determines that the transported object has been placed on an object placing face when the output of the hand position detection unit and the output of the angle detection unit become constant after the output of the force detection unit becomes close to 0, and wherein, upon determination by the transported object placed-state determining unit that the object has been placed on the object placing face, a controlling operation in the vertical direction of the robot arm is switched from the force-controlling operation to a position-controlling operation.

5. A robot-controlling device that controls a robot provided with a robot arm and a hand arranged at an end of the robot arm, so as to transport an object positioned between a person and the robot in cooperation with the person, with the object being held by the person and the hand, the robot-controlling device comprising:

an input unit to which force information detected by a force detection unit that detects a force exerted between the object and the hand, and angle information detected by an angle detection unit that detects an angle of the hand that is angle-adjusted by a driving unit are inputted;

a control unit that carries out a force controlling operation for controlling a force in a vertical direction of the robot arm based upon the force information of the force detection unit and the angle information of the angle detection unit; and a transporting force estimation unit that estimates a force that the person exerts on the robot in the vertical direction as an input in the vertical direction of the force controlling operation, by using a value obtained by the expression $(k_p F_z + k_\omega \omega_p)$ when the value detected by the force detection unit is less than or equal to 0, wherein $k_p$ and $k_\omega$ are coefficients, $F_z$ is the vertical component of the output of the force detection unit, and $\omega_p$ is the output of the angle detection unit, wherein, when the value detected by the force detection unit is greater than 0, the transporting force estimation unit outputs the value detected by the force detection unit, wherein based upon the force estimated by the transporting force estimation unit, the force controlling operation is carried out by the control unit so as to set the force in the vertical direction of the robot arm to a predetermined force.

6. The robot-controlling device of claim 5, further comprising:

a hand position detection unit that detects a position of the hand of the end of the robot arm; and a transported object placed-state determining unit that determines whether or not the transported object has been placed on an object placing face based upon output of the hand position detection unit, output of the angle detection unit, and output of the force detection unit, wherein the transport object placed-state determining unit determines that the transported object has been placed on an object placing face when the output of the hand position detection unit and the output of the angle detection unit become constant after the output of the force detection unit becomes close to 0, and wherein, upon determination by the transported object placed-state determining unit that the object has been placed on the object placing face, a controlling operation in the vertical direction of the robot arm is switched from the force-controlling operation to a position-controlling operation.

7. A robot-controlling device that controls a robot provided with a robot arm and a hand arranged at an end of the robot arm, so as to transport an object positioned between a person and the robot in cooperation with the person, with the object being held by the person and the hand, the robot-controlling device comprising:

an input unit to which force information detected by a force detection unit that detects a force exerted between the object and the hand, and angle information detected by an angle detection unit that detects an angle of the hand that is angle-adjusted by a driving unit are inputted;

a control unit that carries out a force controlling operation for controlling so as to set a force in a vertical direction of the robot arm to a predetermined force, based upon the force information of the force detection unit and the angle information of the angle detection unit;

a hand position detection unit that detects a position of the hand of the end of the robot arm; and a transported object placed-state determining unit that determines whether or not the transported object has been placed on an object placing face based upon output of the hand position detection unit, output of the angle detection unit, and output of the force detection unit, wherein the transport object placed-state determining unit determines that the transported object has been placed on an object placing face when the output of the hand position detection unit and the output of the angle detection unit become constant after the output of the force detection unit becomes close to 0, and wherein, upon determination by the transported object placed-state determining unit that the object has been placed on the object placing face, a controlling operation in the vertical direction of the robot arm is switched from the force-controlling operation to a position-controlling operation.

8. The robot-controlling device according to claim 7, wherein, when the hand of the robot arm is directed downward from a horizontal face by the output of the angle detection unit, when variation of the hand position is turned from a downward direction to a constant state by the output of the hand position detection unit, and when a downward force in the vertical direction of output of the force detection unit is turned into a decrease, the transported object placed-state determining unit determines that the transported object has been placed on the object placing face.

9. A robot-controlling method that controls a robot provided with a robot arm and a hand arranged at an end of the robot arm, so as to transport an object positioned between a person and the robot in cooperation with the person, with the object being held by the person and the hand, the robot-controlling method comprising:

acquiring force information detected by a force detection unit that detects a force exerted between the object and the hand, and angle information detected by an angle detection unit that detects an angle of the hand that is angle-adjusted by a driving unit that are inputted through an input unit;

by using a control unit, carrying out a force controlling operation of controlling a force in a vertical direction of the robot arm based upon the force information of the force detection unit and the angle information of the angle detection unit; and by using a transporting force estimation unit, estimating a force that the person exerts on the robot in the vertical direction as an input in the vertical direction of the force controlling operation, by using a value obtained by the expression $(k_p F_z + k_\omega \omega_p)$ when the value detected by the force detection unit is less than or equal to 0, wherein $k_p$ and $k_\omega$ are coefficients, $F_z$ is the vertical component of the output of the force detection unit, and $\omega_p$ is the output of the angle detection unit, wherein, when the value detected by the force detection unit is greater than 0, the transporting force estimation unit outputs the value detected by the force detection unit, wherein based upon the force estimated by the transporting force estimation unit, the force controlling operation is carried out so as to set the force in the vertical direction of the robot arm to a predetermined force.

10. A controlling program stored on a non-transitory computer readable recording medium, the controlling program being for a robot that controls a robot provided with a robot arm and a hand arranged at an end of the robot arm, so as to transport an object positioned between a person and the robot in cooperation with the person, with the object being held by the person and the hand, the controlling program causing a computer to perform steps comprising:

receiving force information detected by a force detection unit that detects a force exerted between the object and the hand, and angle information detected by an angle detection unit that detects an angle of the hand that is angle-adjusted by a driving unit, through an input unit;

by using a control unit, carrying out a force controlling operation of controlling so as to set a force in a vertical direction of the robot arm to a predetermined force, based upon the force information of the force detection unit and the angle information of the angle detection unit;

by using a hand position detection unit, detecting the position of the hand of the end of the robot arm; and by using a transported object placed-state determining unit, determining whether or not the transported object has been placed on an object placing face based upon output of the hand position detection unit, output of the angle detection unit, and output of the force detection unit, wherein the transport object placed-state determining unit determines that the transported object has been placed on an object placing face when the output of the hand position detection unit and the output of the angle detection unit become constant after the output of the force detection unit becomes close to 0, and wherein, upon determination by the transported object placed-state determining unit that the object has been placed on the object placing face, the controlling operation in the vertical direction of the robot arm is switched from the force-controlling operation to a position-controlling operation.

* * * * *